(12) United States Patent
Berlin et al.

(10) Patent No.: US 9,158,864 B2
(45) Date of Patent: Oct. 13, 2015

(54) SYSTEMS, METHODS, AND DEVICES FOR DOCUMENTING A LOCATION OF INSTALLED EQUIPMENT

(71) Applicant: Corning MobileAccess Ltd., Airport City (IL)

(72) Inventors: Igor Berlin, Potomac, MD (US); Ami Hazani, Ra'anana (IL)

(73) Assignee: Corning Optical Communications Wireless Ltd, Airport City (IL)

(*) Notice: Subject to any disclaimer, the term of this patent is extended or adjusted under 35 U.S.C. 154(b) by 298 days.

(21) Appl. No.: 13/724,451

(22) Filed: Dec. 21, 2012

(65) Prior Publication Data
US 2014/0180581 A1    Jun. 26, 2014

(51) Int. Cl.
*G06F 17/40*     (2006.01)
*G01S 5/02*      (2010.01)
*G01S 5/10*      (2006.01)
*G06Q 10/08*     (2012.01)

(52) U.S. Cl.
CPC ............... *G06F 17/40* (2013.01); *G01S 5/0263* (2013.01); *G01S 5/10* (2013.01); *G06Q 10/08* (2013.01)

(58) Field of Classification Search
USPC ........................................................ 701/491
See application file for complete search history.

(56) References Cited

U.S. PATENT DOCUMENTS

| | | | |
|---|---|---|---|
| 2,628,312 A | 2/1953 | Peterson et al. | 250/33.69 |
| 3,986,182 A | 10/1976 | Hackett | |
| 4,167,738 A | 9/1979 | Kirkendall | 343/703 |
| 4,449,246 A | 5/1984 | Seiler et al. | |
| 4,573,212 A | 2/1986 | Lipsky | |
| 4,665,560 A | 5/1987 | Lange | |
| 4,935,746 A | 6/1990 | Wells | 343/703 |
| 4,939,852 A | 7/1990 | Brenner | |
| 4,972,346 A | 11/1990 | Kawano et al. | |
| 5,056,109 A | 10/1991 | Gilhousen et al. | |

(Continued)

FOREIGN PATENT DOCUMENTS

| | | | |
|---|---|---|---|
| AU | 2010100320 A4 | 6/2010 | |
| CN | 1222007 A | 7/1999 | |

(Continued)

OTHER PUBLICATIONS

Krempels et al., "Directory-Less Indoor Positioning for WLAN Infrastructures extended abstract," IEEE International Symposium on Consumer Electronics, Apr. 14-16, 2008, Vilamoura, Portugal, 2 pages.

(Continued)

*Primary Examiner* — Thomas Tarcza
*Assistant Examiner* — Alex C Dunn

(57) ABSTRACT

A system, and related methods and devices, is disclosed for documenting a location of installed equipment. The system includes a mobile reader and a memory. The mobile reader is configured to read a unique identification of an equipment unit and to determine a location of the equipment unit while proximate the equipment unit. The location and the unique identification of the equipment unit is associated and stored in the memory. The memory may be located in the mobile reader or in a remotely located database. The mobile reader may be an optical reader configured to read the unique identification from an optical barcode associated with the equipment unit, or the mobile reader may be an RFID reader configured to read the unique identification from an RFID tag associated with the equipment unit.

20 Claims, 8 Drawing Sheets

(56) References Cited

U.S. PATENT DOCUMENTS

| | | | |
|---|---|---|---|
| 5,059,927 A | 10/1991 | Cohen | |
| 5,187,803 A | 2/1993 | Sohner et al. | |
| 5,206,655 A | 4/1993 | Caille et al. | |
| 5,208,812 A | 5/1993 | Dudek et al. | |
| 5,257,407 A | 10/1993 | Heinzelmann | 455/67.1 |
| 5,278,989 A | 1/1994 | Burke et al. | |
| 5,280,472 A | 1/1994 | Gilhousen et al. | |
| 5,381,459 A | 1/1995 | Lappington | |
| 5,396,224 A | 3/1995 | Dukes et al. | |
| 5,420,863 A | 5/1995 | Taketsugu et al. | |
| 5,513,176 A | 4/1996 | Dean et al. | 370/18 |
| 5,519,830 A | 5/1996 | Opoczynski | |
| 5,602,903 A | 2/1997 | LeBlanc et al. | |
| 5,606,725 A | 2/1997 | Hart | |
| 5,668,562 A | 9/1997 | Cutrer et al. | |
| 5,708,681 A | 1/1998 | Malkemes et al. | |
| 5,726,984 A | 3/1998 | Kubler et al. | |
| 5,765,099 A | 6/1998 | Georges et al. | |
| 5,790,536 A | 8/1998 | Mahany et al. | |
| 5,802,173 A | 9/1998 | Hamilton-Piercy et al. | |
| 5,809,395 A | 9/1998 | Hamilton-Piercy et al. | |
| 5,809,431 A | 9/1998 | Bustamante et al. | |
| 5,818,883 A | 10/1998 | Smith et al. | |
| 5,839,052 A | 11/1998 | Dean et al. | |
| 5,862,460 A | 1/1999 | Rich | |
| 5,867,763 A | 2/1999 | Dean et al. | |
| 5,873,040 A | 2/1999 | Dunn et al. | |
| 5,953,670 A | 9/1999 | Newson | |
| 5,969,837 A | 10/1999 | Farber et al. | |
| 5,983,070 A | 11/1999 | Georges et al. | |
| 6,006,069 A | 12/1999 | Langston | |
| 6,011,962 A | 1/2000 | Lindenmeier et al. | 455/226.1 |
| 6,011,980 A | 1/2000 | Nagano et al. | |
| 6,014,546 A | 1/2000 | Georges et al. | |
| 6,037,898 A | 3/2000 | Parish et al. | |
| 6,046,838 A | 4/2000 | Kou et al. | |
| 6,069,721 A | 5/2000 | Oh et al. | |
| 6,108,536 A | 8/2000 | Yafuso et al. | 455/424 |
| 6,118,767 A | 9/2000 | Shen et al. | |
| 6,122,529 A | 9/2000 | Sabat, Jr. et al. | |
| 6,128,470 A | 10/2000 | Naidu et al. | |
| 6,128,477 A | 10/2000 | Freed | |
| 6,157,810 A | 12/2000 | Georges et al. | |
| 6,178,334 B1 | 1/2001 | Shyy et al. | |
| 6,192,216 B1 | 2/2001 | Sabat, Jr. et al. | |
| 6,194,968 B1 | 2/2001 | Winslow | |
| 6,195,561 B1 | 2/2001 | Rose | 455/523 |
| 6,212,397 B1 | 4/2001 | Langston et al. | |
| 6,218,979 B1 | 4/2001 | Barnes et al. | |
| 6,222,503 B1 | 4/2001 | Gietema et al. | |
| 6,223,201 B1 | 4/2001 | Reznak | |
| 6,236,365 B1 | 5/2001 | LeBlanc et al. | |
| 6,236,863 B1 | 5/2001 | Waldroup et al. | |
| 6,249,252 B1 | 6/2001 | Dupray | |
| 6,253,067 B1 | 6/2001 | Tsuji | 455/115 |
| 6,275,990 B1 | 8/2001 | Dapper et al. | |
| 6,279,158 B1 | 8/2001 | Geile et al. | |
| 6,286,163 B1 | 9/2001 | Trimble | |
| 6,295,451 B1 | 9/2001 | Mimura | |
| 6,307,869 B1 | 10/2001 | Pawelski | |
| 6,314,163 B1 | 11/2001 | Acampora | |
| 6,317,599 B1 | 11/2001 | Rappaport et al. | |
| 6,323,980 B1 | 11/2001 | Bloom | |
| 6,330,241 B1 | 12/2001 | Fort | |
| 6,330,244 B1 | 12/2001 | Swartz et al. | |
| 6,334,219 B1 | 12/2001 | Hill et al. | |
| 6,336,021 B1 | 1/2002 | Nukada | |
| 6,336,042 B1 | 1/2002 | Dawson et al. | |
| 6,340,932 B1 | 1/2002 | Rodgers et al. | |
| 6,370,203 B1 | 4/2002 | Boesch et al. | |
| 6,374,124 B1 | 4/2002 | Slabinski | |
| 6,389,010 B1 | 5/2002 | Kubler et al. | |
| 6,400,318 B1 | 6/2002 | Kasami et al. | |
| 6,400,418 B1 | 6/2002 | Wakabayashi | |
| 6,404,775 B1 | 6/2002 | Leslie et al. | |
| 6,405,018 B1 | 6/2002 | Reudink et al. | 455/20 |
| 6,414,624 B2 | 7/2002 | Endo et al. | |
| 6,415,132 B1 | 7/2002 | Sabat, Jr. | |
| 6,421,327 B1 | 7/2002 | Lundby et al. | |
| 6,437,577 B1 | 8/2002 | Fritzmann et al. | 324/523 |
| 6,448,558 B1 | 9/2002 | Greene | |
| 6,452,915 B1 | 9/2002 | Jorgensen | |
| 6,480,702 B1 | 11/2002 | Sabat, Jr. | |
| 6,490,439 B1 | 12/2002 | Croft et al. | 455/90 |
| 6,518,916 B1 | 2/2003 | Ashihara et al. | |
| 6,519,449 B1 | 2/2003 | Zhang et al. | |
| 6,535,330 B1 | 3/2003 | Lelic et al. | |
| 6,535,720 B1 | 3/2003 | Martin et al. | |
| 6,580,402 B2 | 6/2003 | Navarro et al. | |
| 6,580,905 B1 | 6/2003 | Naidu et al. | |
| 6,587,514 B1 | 7/2003 | Wright et al. | |
| 6,598,009 B2 | 7/2003 | Yang | |
| 6,615,074 B2 | 9/2003 | Mickle et al. | |
| 6,628,732 B1 | 9/2003 | Takaki | |
| 6,657,535 B1 | 12/2003 | Magbie et al. | |
| 6,658,269 B1 | 12/2003 | Golemon et al. | |
| 6,665,308 B1 | 12/2003 | Rakib et al. | |
| 6,670,930 B2 | 12/2003 | Navarro | |
| 6,678,509 B2 | 1/2004 | Skarman et al. | |
| 6,704,298 B1 | 3/2004 | Matsumiya et al. | |
| 6,714,800 B2 | 3/2004 | Johnson et al. | |
| 6,731,880 B2 | 5/2004 | Westbrook et al. | |
| 6,745,013 B1 | 6/2004 | Porter et al. | |
| 6,763,226 B1 | 7/2004 | McZeal, Jr. | |
| 6,782,048 B2 | 8/2004 | Santhoff | |
| 6,785,558 B1 | 8/2004 | Stratford et al. | |
| 6,801,767 B1 | 10/2004 | Schwartz et al. | |
| 6,823,174 B1 | 11/2004 | Masenten et al. | |
| 6,826,163 B2 | 11/2004 | Mani et al. | |
| 6,836,660 B1 | 12/2004 | Wala | |
| 6,836,673 B1 | 12/2004 | Trott | |
| 6,842,433 B2 | 1/2005 | West et al. | |
| 6,850,510 B2 | 2/2005 | Kubler et al. | |
| 6,876,056 B2 | 4/2005 | Tilmans et al. | |
| 6,876,945 B2 | 4/2005 | Emord | |
| 6,882,311 B2 | 4/2005 | Walker et al. | |
| 6,885,344 B2 | 4/2005 | Mohamadi | |
| 6,889,060 B2 | 5/2005 | Fernando et al. | |
| 6,906,681 B2 | 6/2005 | Hoppenstein | 343/853 |
| 6,909,399 B1 | 6/2005 | Zegelin et al. | |
| 6,915,529 B1 | 7/2005 | Suematsu et al. | |
| 6,919,858 B2 | 7/2005 | Rofougaran | |
| 6,928,281 B2 | 8/2005 | Ward et al. | 455/423 |
| 6,931,659 B1 | 8/2005 | Kinemura | |
| 6,934,511 B1 | 8/2005 | Lovinggood et al. | |
| 6,934,541 B2 | 8/2005 | Miyatani | |
| 6,941,112 B2 | 9/2005 | Hasegawa | |
| 6,946,989 B2 | 9/2005 | Vavik | |
| 6,952,181 B2 | 10/2005 | Karr et al. | |
| 6,961,312 B2 | 11/2005 | Kubler et al. | |
| 6,967,347 B2 | 11/2005 | Estes et al. | |
| 6,977,502 B1 | 12/2005 | Hertz | |
| 6,983,174 B2 | 1/2006 | Hoppenstein et al. | 455/562.1 |
| 7,002,511 B1 | 2/2006 | Ammar et al. | |
| 7,015,826 B1 | 3/2006 | Chan et al. | |
| 7,020,473 B2 | 3/2006 | Splett | |
| 7,020,488 B1 | 3/2006 | Bleile et al. | |
| 7,024,166 B2 | 4/2006 | Wallace et al. | |
| 7,035,594 B2 | 4/2006 | Wallace et al. | 455/67.12 |
| 7,039,399 B2 | 5/2006 | Fischer | |
| 7,043,271 B1 | 5/2006 | Seto et al. | |
| 7,047,028 B2 | 5/2006 | Cagenius | |
| 7,050,017 B2 | 5/2006 | King et al. | |
| 7,053,838 B2 | 5/2006 | Judd | |
| 7,069,577 B2 | 6/2006 | Geile et al. | |
| 7,072,586 B2 | 7/2006 | Aburakawa et al. | |
| 7,084,758 B1 | 8/2006 | Cole | |
| 7,103,119 B2 | 9/2006 | Matsuoka et al. | |
| 7,103,377 B2 | 9/2006 | Bauman et al. | |
| 7,110,795 B2 | 9/2006 | Doi | |
| 7,113,780 B2 | 9/2006 | McKenna et al. | |
| 7,129,886 B2 | 10/2006 | Hall et al. | |
| 7,142,535 B2 | 11/2006 | Kubler et al. | |
| 7,142,619 B2 | 11/2006 | Sommer et al. | |

(56) References Cited

U.S. PATENT DOCUMENTS

| | | | |
|---|---|---|---|
| 7,146,134 B2 | 12/2006 | Moon et al. ............... 455/67.11 |
| 7,171,244 B2 | 1/2007 | Bauman |
| 7,177,623 B2 | 2/2007 | Baldwin |
| 7,183,910 B2 | 2/2007 | Alvarez et al. |
| 7,184,728 B2 | 2/2007 | Solum |
| 7,190,748 B2 | 3/2007 | Kim et al. |
| 7,194,023 B2 | 3/2007 | Norrell et al. |
| 7,194,275 B2 | 3/2007 | Bolin et al. |
| 7,196,656 B2 | 3/2007 | Shirakawa |
| 7,199,443 B2 | 4/2007 | Elsharawy |
| 7,233,771 B2 | 6/2007 | Proctor, Jr. et al. ......... 455/11.1 |
| 7,256,727 B2 | 8/2007 | Fullerton et al. |
| 7,272,359 B2 | 9/2007 | Li et al. .................... 455/67.13 |
| 7,280,011 B2 | 10/2007 | Bayar et al. |
| 7,298,327 B2 | 11/2007 | Dupray et al. |
| 7,315,735 B2 | 1/2008 | Graham |
| 7,324,837 B2 | 1/2008 | Yamakita ..................... 455/561 |
| 7,336,961 B1 | 2/2008 | Ngan |
| 7,348,843 B1 | 3/2008 | Qiu et al. |
| 7,359,674 B2 | 4/2008 | Markki et al. |
| 7,359,718 B2 | 4/2008 | Tao et al. |
| 7,366,151 B2 | 4/2008 | Kubler et al. |
| 7,369,526 B2 | 5/2008 | Lechleider et al. |
| 7,385,384 B2 | 6/2008 | Rocher ......................... 324/123 |
| 7,388,892 B2 | 6/2008 | Nishiyama et al. |
| 7,392,025 B2 | 6/2008 | Rooyen et al. |
| 7,395,181 B2 | 7/2008 | Foxlin |
| 7,412,224 B2 | 8/2008 | Kotola et al. |
| 7,421,288 B2 | 9/2008 | Funakubo .................. 455/562.1 |
| 7,450,853 B2 | 11/2008 | Kim et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,471,243 B2 | 12/2008 | Roslak |
| 7,483,711 B2 | 1/2009 | Burchfiel |
| 7,495,560 B2 | 2/2009 | Easton et al. |
| 7,505,747 B2 | 3/2009 | Solum |
| 7,512,419 B2 | 3/2009 | Solum |
| 7,512,450 B2 * | 3/2009 | Ahmed ............................ 700/19 |
| 7,525,484 B2 | 4/2009 | Dupray et al. |
| 7,535,796 B2 | 5/2009 | Holm et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,833 B2 * | 6/2009 | Ahmed .......................... 702/188 |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,218 B2 | 12/2009 | Hurley |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,679,562 B2 | 3/2010 | Shirakawa |
| 7,688,811 B2 | 3/2010 | Kubler et al. |
| 7,693,486 B2 | 4/2010 | Kasslin et al. |
| 7,693,654 B1 * | 4/2010 | Dietsch et al. ................. 701/461 |
| 7,697,467 B2 | 4/2010 | Kubler et al. |
| 7,697,574 B2 | 4/2010 | Suematsu et al. |
| 7,698,228 B2 | 4/2010 | Gailey et al. |
| 7,714,778 B2 | 5/2010 | Dupray |
| 7,715,375 B2 | 5/2010 | Kubler et al. |
| 7,751,374 B2 | 7/2010 | Donovan |
| 7,751,838 B2 | 7/2010 | Ramesh et al. |
| 7,751,971 B2 | 7/2010 | Chang et al. |
| 7,760,703 B2 | 7/2010 | Kubler et al. |
| 7,764,231 B1 | 7/2010 | Karr et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,887 B2 | 8/2010 | Gupta et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,654 B2 | 12/2010 | Sauer et al. |
| 7,848,765 B2 | 12/2010 | Phillips et al. |
| 7,848,770 B2 | 12/2010 | Scheinert |
| 7,853,234 B2 | 12/2010 | Afsahi |
| 7,860,518 B2 | 12/2010 | Flanagan et al. |
| 7,860,519 B2 | 12/2010 | Portman et al. |
| 7,864,673 B2 | 1/2011 | Bonner |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,903,029 B2 | 3/2011 | Dupray |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,066 B1 | 3/2011 | Osterweil |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,952,512 B1 | 5/2011 | Delker et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,970,648 B2 | 6/2011 | Gailey et al. |
| 7,990,925 B2 | 8/2011 | Tinnakornsrisuphap et al. |
| 7,996,020 B1 | 8/2011 | Chhabra |
| 7,996,281 B2 | 8/2011 | Alvarez et al. |
| 8,005,050 B2 | 8/2011 | Scheinert et al. |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,032,153 B2 | 10/2011 | Dupray et al. |
| 8,036,308 B2 | 10/2011 | Rofougaran |
| 8,072,381 B1 | 12/2011 | Ziegler |
| 8,073,565 B2 | 12/2011 | Johnson |
| 8,081,923 B1 | 12/2011 | Larsen et al. |
| 8,082,096 B2 | 12/2011 | Dupray |
| 8,082,353 B2 | 12/2011 | Huber et al. |
| 8,086,192 B2 | 12/2011 | Rofougaran et al. |
| 8,090,383 B1 | 1/2012 | Emigh et al. |
| 8,111,998 B2 | 2/2012 | George et al. |
| 8,135,413 B2 | 3/2012 | Dupray |
| 8,213,264 B2 | 7/2012 | Lee et al. |
| 8,326,315 B2 | 12/2012 | Phillips et al. |
| 8,364,171 B2 | 1/2013 | Busch |
| 8,442,556 B2 | 5/2013 | Rawat et al. |
| 8,570,914 B2 | 10/2013 | Sauer |
| 8,604,909 B1 | 12/2013 | Amir et al. |
| 8,774,843 B2 | 7/2014 | Mangold et al. |
| 8,983,301 B2 | 3/2015 | Baker et al. |
| 2001/0036199 A1 | 11/2001 | Terry |
| 2002/0051434 A1 | 5/2002 | Ozluturk et al. |
| 2002/0123365 A1 | 9/2002 | Thorson et al. |
| 2002/0128009 A1 | 9/2002 | Boch et al. |
| 2003/0083052 A1 | 5/2003 | Hosaka |
| 2003/0146871 A1 | 8/2003 | Karr et al. |
| 2003/0157943 A1 | 8/2003 | Sabat, Jr. |
| 2004/0022215 A1 | 2/2004 | Okuhata et al. |
| 2004/0095907 A1 | 5/2004 | Agee et al. |

(56) References Cited

U.S. PATENT DOCUMENTS

| | | |
|---|---|---|
| 2004/0102196 A1 | 5/2004 | Weckstrom et al. |
| 2004/0131025 A1 | 7/2004 | Dohler et al. |
| 2004/0139477 A1 | 7/2004 | Russell et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0165573 A1 | 8/2004 | Kubler et al. |
| 2004/0175173 A1 | 9/2004 | Deas |
| 2004/0179852 A1 | 9/2004 | Westbrook et al. |
| 2004/0196404 A1 | 10/2004 | Loheit et al. |
| 2004/0198386 A1 | 10/2004 | Dupray |
| 2004/0235497 A1 | 11/2004 | Zekavat |
| 2004/0246926 A1 | 12/2004 | Belcea et al. |
| 2005/0003873 A1 | 1/2005 | Naidu et al. ............... 455/575.7 |
| 2005/0020309 A1 | 1/2005 | Moeglein et al. |
| 2005/0102180 A1 | 5/2005 | Gailey et al. |
| 2005/0143091 A1 | 6/2005 | Shapira et al. |
| 2005/0147071 A1 | 7/2005 | Karaoguz et al. |
| 2005/0148306 A1 | 7/2005 | Hiddink ........................ 455/101 |
| 2005/0153712 A1 | 7/2005 | Osaka et al. |
| 2005/0246094 A1* | 11/2005 | Moscatiello .................. 701/207 |
| 2005/0272439 A1 | 12/2005 | Picciriello et al. |
| 2005/0281213 A1 | 12/2005 | Dohn ........................... 370/310 |
| 2006/0014548 A1 | 1/2006 | Bolin et al. |
| 2006/0025158 A1 | 2/2006 | Leblanc et al. |
| 2006/0056327 A1 | 3/2006 | Coersmeier |
| 2006/0092880 A1 | 5/2006 | Nounin et al. |
| 2006/0183504 A1 | 8/2006 | Tanaka et al. |
| 2006/0209752 A1 | 9/2006 | Wijngaarden et al. |
| 2006/0223439 A1 | 10/2006 | Pinel et al. |
| 2006/0274704 A1 | 12/2006 | Desai et al. |
| 2006/0276202 A1 | 12/2006 | Moeglein et al. |
| 2007/0004437 A1 | 1/2007 | Harada et al. |
| 2007/0054682 A1 | 3/2007 | Fanning et al. |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0093273 A1 | 4/2007 | Cai |
| 2007/0104128 A1 | 5/2007 | Laroia et al. |
| 2007/0104164 A1 | 5/2007 | Laroia et al. |
| 2007/0140168 A1 | 6/2007 | Laroia et al. |
| 2007/0172241 A1 | 7/2007 | Kwon et al. |
| 2007/0202844 A1 | 8/2007 | Wilson et al. |
| 2007/0224954 A1 | 9/2007 | Gopi |
| 2007/0253355 A1 | 11/2007 | Hande et al. |
| 2007/0268846 A1 | 11/2007 | Proctor, Jr. et al. |
| 2007/0268853 A1 | 11/2007 | Ma et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0043714 A1 | 2/2008 | Pernu |
| 2008/0058018 A1 | 3/2008 | Scheinert ..................... 455/562.1 |
| 2008/0063397 A1 | 3/2008 | Hu et al. |
| 2008/0077326 A1 | 3/2008 | Funk et al. |
| 2008/0098203 A1 | 4/2008 | Master et al. |
| 2008/0101277 A1 | 5/2008 | Taylor et al. |
| 2008/0118014 A1 | 5/2008 | Reunamaki et al. |
| 2008/0119208 A1 | 5/2008 | Flanagan et al. |
| 2008/0129634 A1 | 6/2008 | Pera et al. |
| 2008/0134194 A1 | 6/2008 | Liu |
| 2008/0167049 A1 | 7/2008 | Karr et al. |
| 2008/0194226 A1 | 8/2008 | Rivas et al. |
| 2008/0201226 A1 | 8/2008 | Carlson et al. |
| 2008/0207253 A1 | 8/2008 | Jaakkola et al. |
| 2008/0232328 A1 | 9/2008 | Scheinert et al. |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0268871 A1 | 10/2008 | Kim et al. |
| 2008/0270522 A1 | 10/2008 | Souissi |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0310341 A1 | 12/2008 | Koyanagi |
| 2008/0310464 A1 | 12/2008 | Schneider |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0059903 A1 | 3/2009 | Kubler et al. |
| 2009/0061796 A1 | 3/2009 | Arkko et al. |
| 2009/0073054 A1 | 3/2009 | Yoon et al. |
| 2009/0073885 A1 | 3/2009 | Jalil et al. |
| 2009/0073916 A1 | 3/2009 | Zhang et al. |
| 2009/0088071 A1 | 4/2009 | Rofougaran |
| 2009/0141780 A1 | 6/2009 | Cruz-Albrecht et al. |
| 2009/0143076 A1 | 6/2009 | Wachter et al. |
| 2009/0149221 A1 | 6/2009 | Liu et al. |
| 2009/0163224 A1 | 6/2009 | Dean et al. |
| 2009/0175214 A1 | 7/2009 | Sfar et al. |
| 2009/0176507 A1 | 7/2009 | Wu et al. |
| 2009/0191891 A1 | 7/2009 | Ma et al. |
| 2009/0216449 A1* | 8/2009 | Erko et al. .................... 701/300 |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0280835 A1 | 11/2009 | Males et al. |
| 2009/0285147 A1 | 11/2009 | Subasic et al. |
| 2010/0002626 A1 | 1/2010 | Schmidt et al. |
| 2010/0007485 A1 | 1/2010 | Kodrin et al. |
| 2010/0008337 A1 | 1/2010 | Bajko |
| 2010/0027443 A1 | 2/2010 | LoGalbo et al. |
| 2010/0048163 A1 | 2/2010 | Parr et al. |
| 2010/0056200 A1 | 3/2010 | Tolonen |
| 2010/0061291 A1 | 3/2010 | Wala |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0121567 A1 | 5/2010 | Mendelson |
| 2010/0127937 A1 | 5/2010 | Chandrasekaran et al. |
| 2010/0128568 A1 | 5/2010 | Han et al. |
| 2010/0130233 A1 | 5/2010 | Parker |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0151821 A1 | 6/2010 | Sweeney et al. |
| 2010/0156721 A1 | 6/2010 | Alamouti et al. |
| 2010/0159859 A1 | 6/2010 | Rofougaran |
| 2010/0178936 A1 | 7/2010 | Wala et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0234045 A1 | 9/2010 | Karr et al. |
| 2010/0246558 A1 | 9/2010 | Harel |
| 2010/0254356 A1 | 10/2010 | Tynderfeldt et al. |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0273504 A1 | 10/2010 | Bull et al. |
| 2010/0284323 A1 | 11/2010 | Tang et al. |
| 2010/0287011 A1 | 11/2010 | Muchkaev |
| 2010/0290355 A1 | 11/2010 | Roy et al. |
| 2010/0291949 A1 | 11/2010 | Shapira et al. |

(56) References Cited

U.S. PATENT DOCUMENTS

| | | |
|---|---|---|
| 2010/0309049 A1 | 12/2010 | Reunamäki et al. |
| 2010/0309752 A1 | 12/2010 | Lee et al. |
| 2010/0311472 A1 | 12/2010 | Rofougaran et al. |
| 2010/0311480 A1 | 12/2010 | Raines et al. |
| 2010/0317371 A1 | 12/2010 | Westerinen et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028157 A1 | 2/2011 | Larsen |
| 2011/0028161 A1 | 2/2011 | Larsen |
| 2011/0035284 A1 | 2/2011 | Moshfeghi |
| 2011/0050501 A1 | 3/2011 | Aljadeff |
| 2011/0065450 A1 | 3/2011 | Kazmi |
| 2011/0066774 A1 | 3/2011 | Rofougaran |
| 2011/0068981 A1 | 3/2011 | Marks et al. |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0122912 A1 | 5/2011 | Benjamin et al. |
| 2011/0124347 A1 | 5/2011 | Chen et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0159876 A1 | 6/2011 | Segall et al. |
| 2011/0159891 A1 | 6/2011 | Segall et al. |
| 2011/0171912 A1 | 7/2011 | Beck et al. |
| 2011/0171946 A1 | 7/2011 | Soehren |
| 2011/0171973 A1 | 7/2011 | Beck et al. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0210843 A1 | 9/2011 | Kummetz |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268452 A1 | 11/2011 | Beamon et al. |
| 2011/0274021 A1 | 11/2011 | He et al. |
| 2011/0279445 A1 | 11/2011 | Murphy et al. |
| 2011/0281536 A1 | 11/2011 | Lee et al. |
| 2011/0312340 A1 | 12/2011 | Wu et al. |
| 2012/0028649 A1 | 2/2012 | Gupta et al. |
| 2012/0039320 A1 | 2/2012 | Lemson et al. |
| 2012/0046049 A1 | 2/2012 | Curtis et al. |
| 2012/0058775 A1 | 3/2012 | Dupray et al. |
| 2012/0072106 A1 | 3/2012 | Han et al. |
| 2012/0081248 A1 | 4/2012 | Kennedy et al. |
| 2012/0084177 A1 | 4/2012 | Tanaka et al. |
| 2012/0087212 A1 | 4/2012 | Vartanian et al. |
| 2012/0095779 A1 | 4/2012 | Wengrovitz et al. |
| 2012/0108258 A1 | 5/2012 | Li |
| 2012/0130632 A1 | 5/2012 | Bandyopadhyay et al. |
| 2012/0135755 A1 | 5/2012 | Lee et al. |
| 2012/0158297 A1 | 6/2012 | Kim et al. |
| 2012/0158509 A1 | 6/2012 | Zivkovic et al. |
| 2012/0179548 A1 | 7/2012 | Sun et al. |
| 2012/0179549 A1 | 7/2012 | Sigmund et al. |
| 2012/0179561 A1 | 7/2012 | Sun et al. |
| 2012/0196626 A1 | 8/2012 | Fano et al. |
| 2012/0215438 A1 | 8/2012 | Liu et al. |
| 2012/0221392 A1 | 8/2012 | Baker et al. |
| 2012/0232917 A1 | 9/2012 | Al-Khudairy et al. |
| 2012/0243469 A1 | 9/2012 | Klein |
| 2012/0303446 A1 | 11/2012 | Busch |
| 2012/0303455 A1 | 11/2012 | Busch |
| 2012/0309336 A1 | 12/2012 | Tanaka et al. |
| 2012/0310836 A1 | 12/2012 | Eden et al. |
| 2013/0006663 A1 | 1/2013 | Bertha et al. |
| 2013/0006849 A1 | 1/2013 | Morris |
| 2013/0036012 A1 | 2/2013 | Lin et al. |
| 2013/0040654 A1 | 2/2013 | Parish |
| 2013/0041761 A1 | 2/2013 | Voda |
| 2013/0045758 A1 | 2/2013 | Khorashadi et al. |
| 2013/0046691 A1 | 2/2013 | Culton |
| 2013/0066821 A1 | 3/2013 | Moore et al. |
| 2013/0073336 A1 | 3/2013 | Heath |
| 2013/0073377 A1 | 3/2013 | Heath |
| 2013/0073388 A1 | 3/2013 | Heath |
| 2013/0073422 A1 | 3/2013 | Moore et al. |
| 2013/0080578 A1 | 3/2013 | Murad et al. |
| 2013/0084859 A1 | 4/2013 | Azar |
| 2013/0116922 A1* | 5/2013 | Cai et al. .................. 701/515 |
| 2013/0131972 A1* | 5/2013 | Kumar et al. ............. 701/409 |
| 2013/0157664 A1 | 6/2013 | Chow et al. |
| 2013/0281125 A1 | 10/2013 | Schmidt |
| 2013/0314210 A1* | 11/2013 | Schoner et al. ............ 340/8.1 |
| 2013/0322214 A1 | 12/2013 | Neukirch et al. |
| 2013/0322415 A1 | 12/2013 | Chamarti et al. |
| 2014/0112667 A1 | 4/2014 | Neukirch et al. |
| 2014/0213285 A1 | 7/2014 | Sauer |
| 2014/0323150 A1 | 10/2014 | Mangold et al. |

FOREIGN PATENT DOCUMENTS

| | | |
|---|---|---|
| CN | 1242911 A | 1/2000 |
| EP | 0851618 A2 | 7/1998 |
| EP | 1227605 A2 | 7/2002 |
| EP | 1347584 A2 | 9/2003 |
| EP | 1448008 A1 | 8/2004 |
| EP | 1005774 B1 | 3/2007 |
| EP | 1954019 A1 | 8/2008 |
| EP | 2192811 A1 | 6/2010 |
| JP | 2002353813 A | 12/2002 |
| JP | 2009288245 A | 12/2009 |
| WO | 9603823 A1 | 2/1996 |
| WO | 0072475 A1 | 11/2000 |
| WO | 02087275 A2 | 10/2002 |
| WO | 03024027 A1 | 3/2003 |
| WO | 2005060338 A2 | 7/2005 |
| WO | 2006076600 A1 | 7/2006 |
| WO | 2008099383 A2 | 8/2008 |
| WO | 2008099390 A2 | 8/2008 |
| WO | 2009081376 A2 | 7/2009 |
| WO | 2009097237 A1 | 8/2009 |
| WO | 2010090999 A1 | 8/2010 |
| WO | 2011017700 A1 | 2/2011 |
| WO | 2011091859 A1 | 8/2011 |
| WO | 2011123336 A1 | 10/2011 |

OTHER PUBLICATIONS

International Search Report for International Patent Application PCT/US2013/043230 mailed Dec. 4, 2013, 5 pages.
Non-final Office Action for U.S. Appl. No. 12/509,099 mailed Jan. 12, 2012, 8 pages.
Final Office Action for U.S. Appl. No. 12/509,099 mailed Apr. 11, 2012, 11 pages.
Advisory Action for U.S. Appl. No. 12/509,099 mailed Jun. 18, 2012, 3 pages.
Examiner's Answer to the Appeal Brief for U.S. Appl. No. 12/509,099 mailed Nov. 8, 2012, 15 pages.
Non-final Office Action for U.S. Appl. No. 14/034,948 mailed Apr. 1, 2015, 12 pages.
Translation of First Office Action for Chinese Patent Application No. 201180019718.X, issued on Jul. 16, 2014, 15 pages.
Translation of the Second Office Action for Chinese Patent Application No. 201180019718.X, issued on Jan. 13, 2015, 10 pages.
International Search Report and Written Opinion for PCT/US2010/044884 mailed Oct. 6, 2010, 14 pages.

(56) References Cited

OTHER PUBLICATIONS

International Search Report for PCT/US2013/043107 mailed Sep. 9, 2013, 4 pages.
Non-final Office Action for U.S. Appl. No. 13/628,497 mailed Apr. 24, 2014, 15 pages.
Final Office Action for U.S. Appl. No. 13/628,497 mailed Aug. 7, 2014, 16 pages.
Advisory Action for U.S. Appl. No. 13/628,497 mailed Sep. 17, 2014, 3 pages.
Advisory Action for U.S. Appl. No. 13/628,497 mailed Oct. 6, 2014, 3 pages.
Non-final Office Action for U.S. Appl. No. 13/866,685 mailed Mar. 23, 2015, 13 pages.
Final Office Action for U.S. Appl. No. 14/034,948 mailed Dec. 1, 2014, 12 pages.
Advisory Action for U.S. Appl. No. 14/034,948 mailed Jan. 27, 2015, 2 pages.
Non-final Office Action for U.S. Appl. No. 14/034,948 mailed Sep. 2, 2014, 11 pages.
Girard et al., "Indoor Pedestrian Navigation Using Foot-Mounted IMU and Portable Ultrasound Range Sensors," Open Access Article, Sensors, vol. 11, Issue 8, Aug. 2, 2011, 19 pages.
Kim et al., "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.
Mokni et al., "Coupled sonar inertial navigation system for pedestrian tracking," 13th Conference on Information Fusion, presented Jul. 26-29, 2010, Edinburgh Scotland, 8 pages.
Author Unknown, "Safe Campus Solutions: Going Beyond Emergency Notification," Strategic White Paper, Alcatel-Lucent, Sep. 2008, 13 pages.
Author Unknown, "Cellular Specialties Introduces the First Simulcasted In-building Location-Based Tracking Solution," http://smart-grid.tmcnet.com/news/2009/09/14/4368300.htm, 2 pages.
Gansemer, Sebastian et al., "RSSI-based Euclidean Distance Algorithm for Indoor Positioning adapted for the use in dynamically changing WLAN environments and multi-level buildings," International Conference on Indoor Positioning and Indoor Navigation (IPIN), Sep. 15-17, 2010, Zurich, Switzerland, 2 pages.
Chow et al, "Radio-over-Fiber Distributed Antenna System for WiMAX Bullet Train Field Trial," IEEE Mobile WiMAX Symposium, Jul. 9-10, 2009, Napa Valley, California, 4 pages.
Author Unknown, "CDMA Co-Pilot Transmitter," Product Specifications, Cellular Specialties, Inc., 021-0000-001 MKTG REV 2, Aug. 2009, www.cellularspecialties.com, 2 pages.
International Search Report and Written Opinion for PCT/US2011/029895 mailed Jul. 4, 2011, 12 pages.
International Search Report and Written Opinion for PCT/US2011/049122 mailed Jun. 6, 2012, 12 pages.
Non-final Office Action for U.S. Appl. No. 13/365,843 mailed Jun. 26, 2013, 10 pages.
Notice of Allowance for U.S. Appl. No. 13/365,843 mailed Jul. 31, 2013, 8 pages.
Non-final Office Action for U.S. Appl. No. 13/485,038 mailed Dec. 20, 2013, 13 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Cho et al. "The Forward Link Performance of a PCS System with an AGC," 4th CDMA International Conference and Exhibition, "The Realization of IMT-2000," 1999, pp. 236-240, vol. 2.
Chu, Ta-Shing S. et al. "Fiber optic microcellular radio", IEEE Transactions on Vehicular Technology, Aug. 1991, pp. 599-606, vol. 40, Issue 3.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE Radio Frequency Integrated Circuits (RFIC) Symposium, Anaheim, California, Jun. 13-15, 1999, pp. 197-200.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.
Decision on Appeal for U.S. Appl. No. 12/509,099 mailed Jul. 15, 2015, 6 pages.
Non-final Office Action for U.S. Appl. No. 14/138,580 mailed May 13, 2015, 20 pages.
Translation of the Third Office Action for Chinese Patent Application No. 201180019718.X issued on Apr. 30, 2015, 10 pages.

* cited by examiner

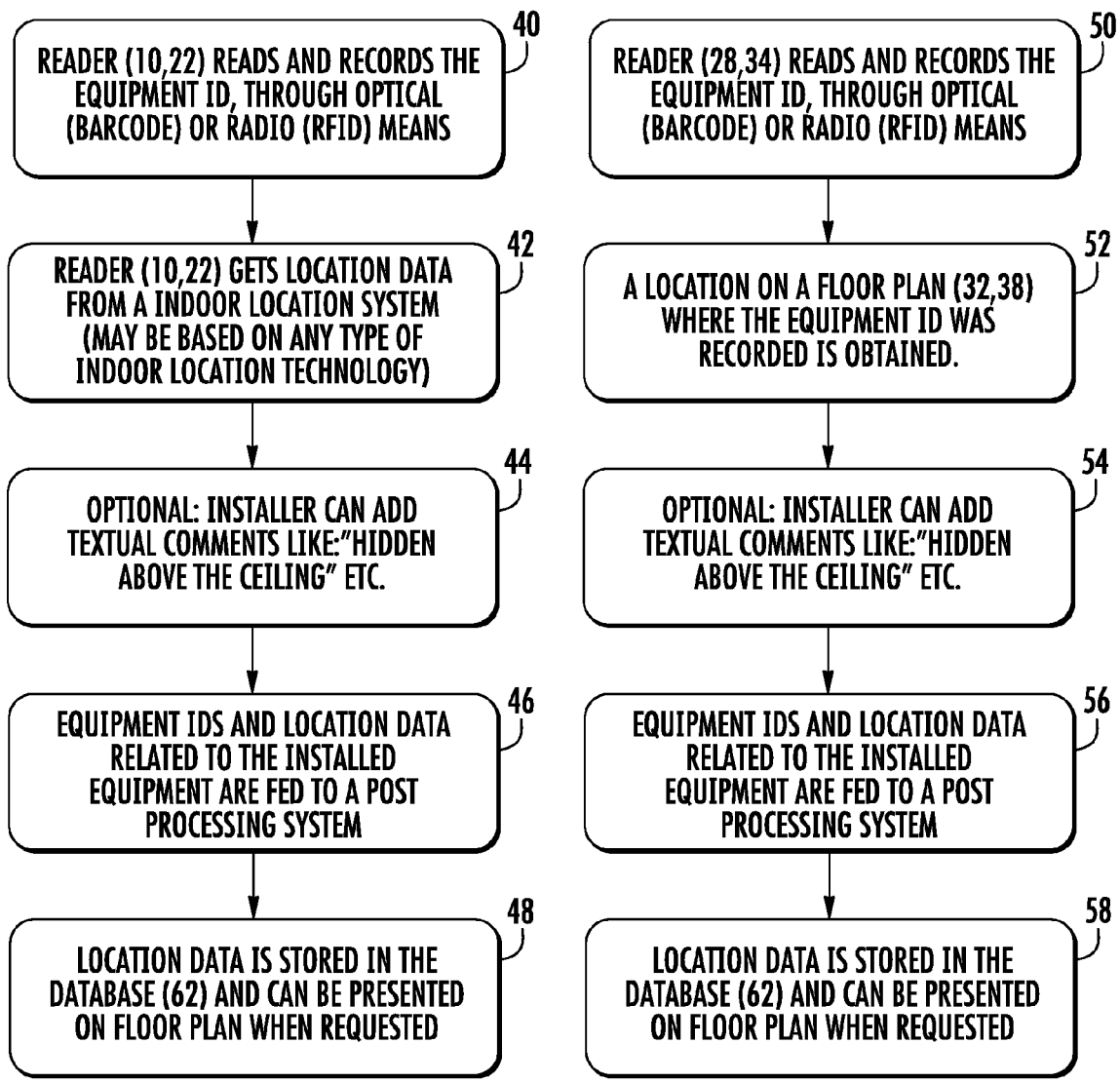

SYSTEMS, METHODS, AND DEVICES FOR DOCUMENTING A LOCATION OF INSTALLED EQUIPMENT

BACKGROUND

1. Field of the Disclosure

The technology of the disclosure relates to documenting the location of installed equipment in a communications system.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., office buildings, coffee shops, airports, libraries, etc.). Distributed antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." The antenna coverage areas are provided by remote antenna units in the distributed antenna system. Remote antenna units can provide antenna coverage areas having radii in the range from a few meters up to twenty (20) meters as an example. If the antenna coverage areas provided each cover a small area, there are typically only a few users (clients) per antenna coverage area. This allows for minimizing the amount of RF bandwidth shared among the wireless system users. It may be desirable to provide antenna coverage areas in a building or other facility to provide indoor distributed antenna system access to clients within the building or facility. It may also be desirable to employ optical fiber to distribute RF communications signals to provide an optical fiber-based distributed antenna system. Distribution of RF communications signals over optical fiber can include Radio-over-Fiber (RoF) distribution. Benefits of optical fiber include increased bandwidth.

When a distributed antenna system or other communication system is installed in a building, the equipment which comprises the system may be installed in various locations throughout the building. Some equipment units may even be hidden above the ceiling, in equipment closets, behind walls, etc. There may be many equipment units installed as part of the installation of the system. The installation process may be time and labor intensive. When the installation is completed, it is useful to document it "as built," and include in this documentation the exact location of each equipment unit. Documentation of the exact location of each equipment unit may be useful for on-going maintenance, expansion planning, and trouble shooting.

SUMMARY OF THE DETAILED DESCRIPTION

Embodiments disclosed in the detailed description include a system for documenting a location of installed equipment, and related methods and devices. In one embodiment, the system includes a mobile reader and a memory. In one embodiment, the mobile reader may be an optical reader configured to read the unique identification from an optical barcode associated with the equipment unit. In another embodiment, the mobile reader may be an RFID reader configured to read the unique identification from an RFID tag associated with the equipment unit. The mobile reader is configured to read a unique identification of an equipment unit and to determine a location of the equipment unit while proximate the equipment unit. The location and the unique identification of the equipment unit is associated and stored in the memory. The memory may be located in the mobile reader or in a remotely located database. By reading the unique identification and determining the location of the equipment unit while the mobile reader is proximate the equipment unit, the location is known to be accurate and can be associated with the unique identification. In this manner, the mobile reader can be used to document the location of equipment units in any system, including as one non-limiting example, a distributed antenna system.

In another embodiment, a method documenting a location of installed equipment is disclosed. The method includes reading a unique identification of an equipment unit using a mobile reader while proximate the equipment unit. A location of the equipment unit is determined using the mobile reader while proximate the equipment unit. The location of the equipment unit is then associated with the unique identification of the equipment unit. In one embodiment, the associated location and unique identification is stored in a memory of the mobile reader or in a remotely located database unit. By reading the unique identification and determining the location of the equipment unit while the reader is proximate the equipment unit, the location is known to be accurate and can be associated with the unique identification.

In one embodiment, the mobile reader is an optical reader and reads the unique identification from an optical barcode associated with the equipment unit. In a different embodiment, the mobile reader is an RFID reader and reads the unique identification from an RFID tag associated with the equipment unit. The location may be determined via a variety of methods. In one embodiment, the mobile reader reads the location from a barcode on a printed floor plan. In another embodiment, the mobile reader is used to obtain the location from a digitized floor plan. In yet other embodiments, the reader uses indoor location determination techniques to determine the location of the equipment unit.

In this regard, embodiments disclosed below include a reader that can read a unique identification of a specific piece of equipment through optical (barcode) or radio (RFID) means and can also determine its location in the building using an indoor location method or by pointing the location on a digitized floor plan. The systems disclosed herein, and related methods and devices, will allow the creation of "as built" documents of installed equipment. In one embodiment, the stored unique identification and the location of the equipment unit may be used to create a floor plan at a later time that shows the location of each piece of installed equipment on the floor plan, together with other information about the equipment.

In this regard, the embodiments described herein provide a capability that can be used with every type of equipment that can be installed in or on a building or other structure. Installing such a system with multiple pieces of equipment (referred to herein as "equipment units") may be a time-intensive and labor-intensive process. The embodiments disclosed herein ease the installation process and provide an easy and efficient way to create "as built" documentation, which may later ease the maintenance and troubleshooting activities. By using the systems, methods, and devices disclosed herein, a location of equipment units "as built" may be automatically documented, which may save time and avoid mistakes as compared to a manual process of documenting the location of the equipment units in a system.

Additional features and advantages will be set forth in the detailed description which follows.

It is to be understood that both the foregoing general description and the following detailed description present embodiments, and are intended to provide an overview or framework for understanding the nature and character of the disclosure. The drawings illustrate various embodiments, and together with the description serve to explain the principles and operation of the concepts disclosed.

BRIEF DESCRIPTION OF THE FIGURES

FIG. 5 is an exemplary flow chart showing a method for providing location data by an indoor location system;

FIG. 6 is an exemplary flow chart showing a method for providing location data by using a floor plan, such as the floor plan in FIG. 3 and/or FIG. 4;

DETAILED DESCRIPTION

Figure 1:
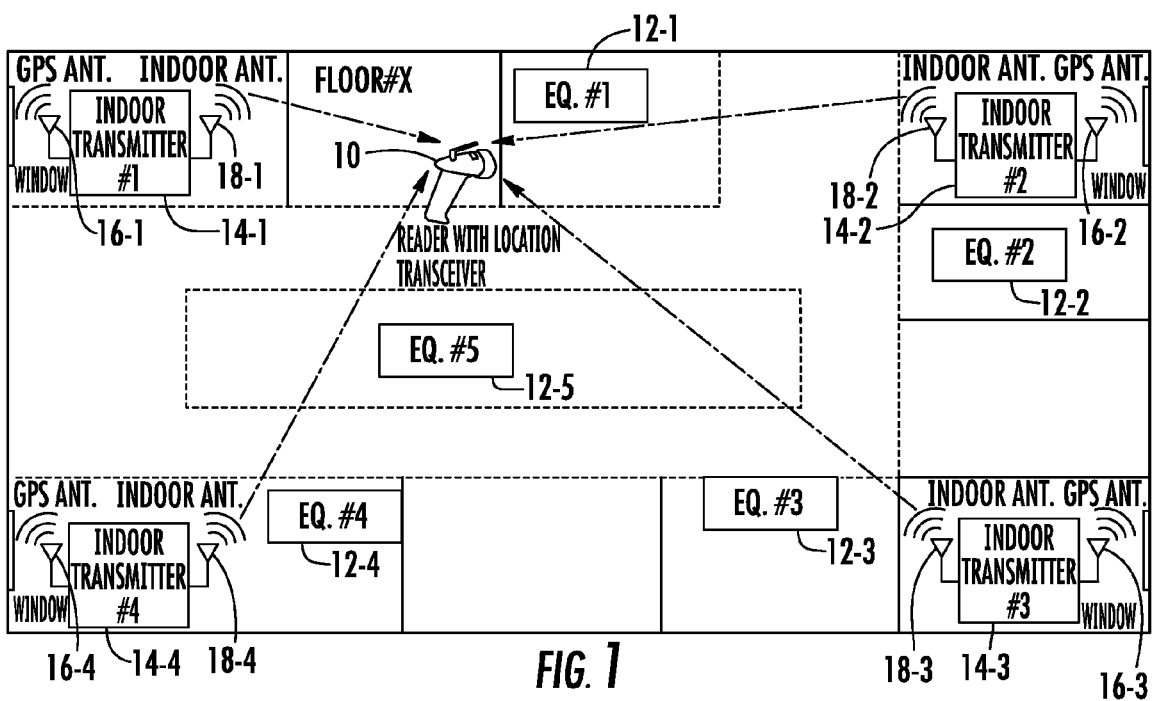
FIG. 1 is a schematic diagram of an exemplary system for providing location information for equipment in a building, in which the location data is provided by using an exemplary global positioning system (GPS)

Reference will now be made in detail to the embodiments, examples of which are illustrated in the accompanying drawings, in which some, but not all embodiments are shown. The concepts may be embodied in many different forms and should not be construed as limiting herein. Whenever possible, like reference numbers will be used to refer to like components or parts.

Embodiments disclosed in the detailed description include a system for documenting a location of installed equipment, and related methods and devices. In one embodiment, the system includes a mobile reader and a memory. In one embodiment, the mobile reader may be an optical reader configured to read the unique identification from an optical barcode associated with the equipment unit. In another embodiment, the mobile reader may be an RFID reader configured to read the unique identification from an RFID tag associated with the equipment unit. The mobile reader is configured to read a unique identification of an equipment unit and to determine a location of the equipment unit while proximate the equipment unit. The location and the unique identification of the equipment unit is associated and stored in the memory. The memory may be located in the reader or in a remotely located database. By reading the unique identification and determining the location of the equipment unit while the mobile reader is proximate the equipment unit, the location is known to be accurate and can be associated with the unique identification. In this manner, the mobile reader can be used to document the location of equipment units in any system, including as one non-limiting example, a distributed antenna system.

Systems, methods, and devices for documenting a location of installed equipment in a communications system will be discussed. Installing some systems, such as a distributed antenna system, as will be discussed more fully below, or other systems having multiple pieces of equipment (referred to herein as "equipment units"), may be a time-intensive and labor-intensive process. The term "equipment unit" as used herein refers to any piece of equipment that is part of a larger system, such as a distributed antenna system as described above, or any other communications system, and includes, but is not limited to, any of the pieces of equipment described below in FIG. 10 and FIG. 11. The embodiments described herein provide a capability that can be used with every type of equipment that can be installed in or on a building or other structure. The embodiments disclosed herein may ease the equipment installation process and provide an easy and efficient way to create "as built" documentation, which may later ease the maintenance and troubleshooting activities.

In this regard, embodiments disclosed below include a reader that can read a unique identification of a specific piece of equipment through optical (barcode) or radio (RFID) means and can also determine its location in the building using an indoor location method or by pointing the location on a digitized floor plan. The installer can also add textual comments like: "Hidden above the ceiling" etc. The equipment IDs and the location data related to the installed equipment are fed to a post processing system and stored in the database. Later, when requested, the location information and identification of the equipment units may be presented on a floor plan.

FIG. 1 is a schematic diagram of an exemplary system for providing location information for equipment in a building, in which the location data is provided by using an exemplary global positioning system (GPS). A reader 10 equipped with an indoor location receiver may be used to determine a location of various equipment units 12. In one embodiment, the reader 10 is a mobile reader. The reader 10 may be an RFID reader or an optical reader. In one embodiment, the determined location is an exact location, for example, GPS coordinates or a specific point as measured by distance from another known point.

The embodiment shown in FIG. 1 includes five (5) pieces of equipment (12-1, 12-2, 12-3, 12-4, and 12-5, collectively referred to as equipment units 12) on a floor of a building, although the system may include any number of equipment units 12. The system may also include one or more indoor location transmitters 14-1, 14-2, 14-3, and 14-4 (collectively referred to as indoor location transmitters 14). Each of the indoor location transmitters 14 may have a GPS antenna 16 and an indoor antenna 18 such that indoor location transmitter 14-1 has GPS antenna 16-1 and indoor antenna 18-1, indoor location transmitter 14-2 has GPS antenna 16-2 and indoor antenna 18-2, indoor location transmitter 14-3 has GPS antenna 16-3 and indoor antenna 18-3, and indoor location transmitter 14-4 has GPS antenna 16-4 and indoor antenna 18-4. The GPS antennas 16 transmit a signal that may be used to determine the GPS coordinates of its respective indoor location transmitter 14, and in turn of each of the equipment units 12. The indoor antennas 18 may transmit signals used to determine a location of one or more of the equipment units 12.

Where the GPS antennas 16 have valid reception from a GPS satellite, the indoor location transmitters 14 may operate in an automatic mode to receive and transmit signals for determining the location. However, where the GPS antennas 16 do not have valid reception from a GPS satellite, or where the indoor location transmitters 14 have no GPS antennas 16 inside the indoor location transmitters 14, there may be a manual setting where GPS coordinates may be manually set. In this case, the reader 10 is configured to receive the manually set GPS coordinates at the reader 10 from the one or more indoor location transmitters 14 and to determine the location of the equipment units 12 using the manually set GPS coordinates received at the reader 10 from the one or more indoor location transmitters 14.

The reader 10 reads an identification of equipment unit 12-1 using optical (barcode) or RFID means while proximate the equipment unit 12-1. For purposes of this application, "proximate" means that the reader 10 is close enough to the equipment unit 12-1 to be able to read an optical barcode or RFID tag on the equipment unit 12-1 and such that the reader 10 is said to be in the same approximate location as the equipment unit 12-1. In one embodiment, the identification may be a unique identification, such as an identification number. For example, a barcode of the identification number may be attached to each of the equipment units 12. In another embodiment, an RFID tag may be attached to each of the equipment units 12, which contains an identification number and optionally other information about the equipment unit 12. While still proximate the equipment unit 12-1, the reader 10 also determines its location (which is also the location of the equipment unit 12-1) using signals received from one or more of the location transmitters 14. These signals may be any wireless or over the air signals (can also be acoustic, as one non-limiting example) in one embodiment. In another embodiment, the signals may be WiFi signals. In other embodiments, the wireless signals may be signals from any wireless technology, including Bluetooth, ZigBee, near field communication (NFC), or other wireless technologies. In one embodiment, the determined location is an exact location, for example, GPS coordinates or a specific point as measured by distance from another known point. The location of the equipment unit 12-1 may then be associated with or linked to the identification number of the equipment unit 12-1.

The reading of the identification number and the determination of a location may be repeated for each of the other equipment units 12-2, 12-3, 12-4, and 12-5. The order of determining location of the equipment units 12 and reading the identification number of the equipment units 12 is not vital and either may be done first, as long as a link between the location and the identification number of the particular equipment unit 12 is made.

A GPS receiver in the reader 10 (see, e.g. transceiver 107, FIG. 10 below) may be used in one embodiment for determining the locations of indoor location transmitters 14 which their signals are received by the reader 10. The installer can also add textual comments like: "Hidden above the ceiling" etc. using the RFID reader 10 or associated means in order to provide additional location information for the equipment unit. For example, the RFID reader 10 may be part of, or communicatively coupled with, a portable computer or smart phone coupled, via a wired or wireless connection, to the Internet. In another embodiment, the RFID reader 10 may have memory sufficient to store the location data and equipment identification numbers for later storage in a database. The equipment IDs and the location data related to the installed equipment units 12 may be sent to a post processing system and stored in a database, as will be discussed in more detail below. In one embodiment, the database is remotely located from the reader and equipment units. In one embodiment, the equipment identification and the location data may be transmitted via an optical fiber distribution system to the remotely located database unit. Later, when requested, the equipment units 12, along with their IDs and their location, may be presented on a floor plan.

Figure 2:
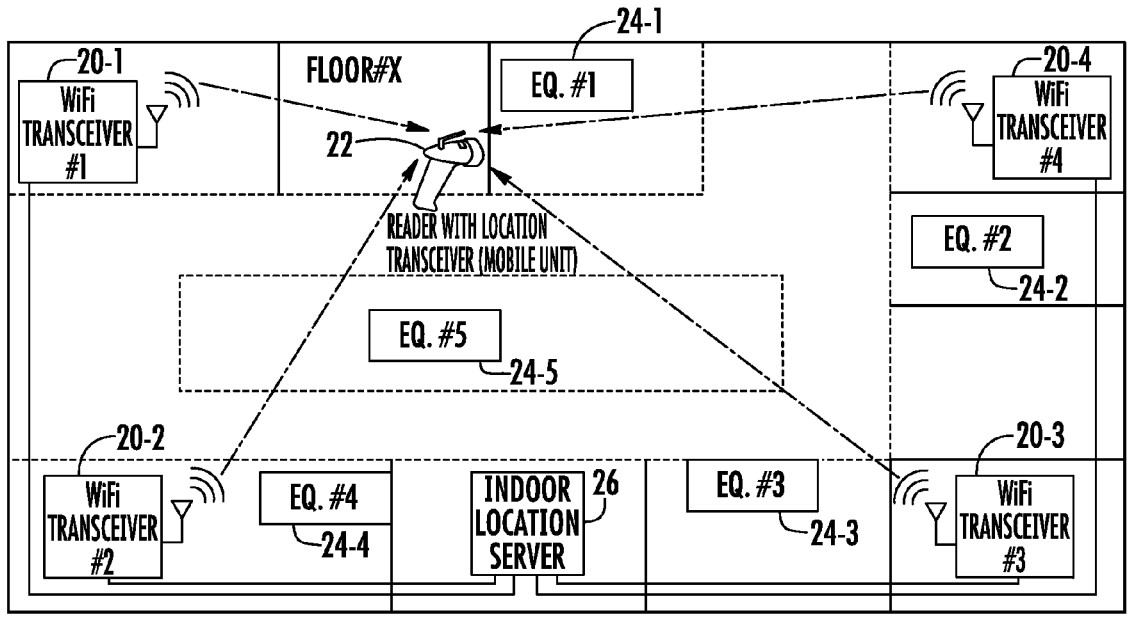
FIG. 2 is a schematic diagram of an exemplary system for providing location information for equipment in a building, in which the location data is provided by using a wireless local area network system, such as Wi-Fi.

FIG. 2 is a schematic diagram of an exemplary system for providing location information for equipment in a building, in which the location data is provided by using a wireless local area network system, such as Wi-Fi. A reader 22 may be equipped with an indoor location WiFi transceiver. In this application, "Wi-Fi" includes, but is not limited to, any "wireless local area network" (WLAN) products that are based on the Institute of Electrical and Electronics Engineers' (IEEE) 802.11 standards. In addition, although the embodiment in FIG. 2 is discussed with respect to WiFi technology, other wireless technologies may be employed, including, but not limited to, Bluetooth, ZigBee, near field communication (NFC), or other wireless technologies. In one embodiment, the reader 22 is a mobile reader, which may be an RFID reader or an optical reader.

The system may also include one or more WiFi transceivers 20-1, 20-2, 20-3, and 20-4 (collectively referred to as WiFi transceivers 20), each of which can transmit and receive WiFi signals. A reader 22 equipped with an indoor location receiver may be used to determine a location of various equipment units 24. The embodiment shown in FIG. 2 includes five (5) pieces of equipment (24-1, 24-2, 24-3, 24-4, and 24-5, collectively referred to as equipment units 24) on a floor of a building, although the system may include any number of equipment units 24. In one embodiment, the WiFi transceivers 20 may be communicatively coupled to an indoor location server 26.

In one embodiment, the reader 22 reads an identification of equipment unit 24-1 using optical (barcode) or radio-frequency identification (RFID) means while proximate the equipment unit 24-1. In one embodiment, the identification may be a unique identification, such as an identification number. For example, in one embodiment, a barcode of the identification number may be attached to each of the equipment units 24. In another embodiment, an RFID tag may be attached to each of the equipment units 24, which contains an identification number and optionally other information about the equipment unit 24 to which the RFID tag is attached. While still proximate the equipment unit 24-1, the reader 22 also determines a location of one or more of the equipment units 24 by one of several location determination modes that may be used.

In one embodiment, the reader 22 receives signals transmitted by one or more of the WiFi transceivers 20 and analyzes them using a location determination technique such as angle of arrival, time of arrival, time differential of arrival, or other known technique. Based on this analysis, the reader 22 determines its location (which is also the location of the respective one of the equipment units 24 at which the reader 22 is currently located near). In one embodiment, the determined location is an exact location, for example, GPS coordinates, or a specific point as measured by distance from another known point.

In another embodiment, the reader 22 transmits WiFi signals. The WiFi signals are received by one or more of the WiFi transceivers 20. The received signals are analyzed by the WiFi transceivers 20 using a location determination technique such as angle of arrival, time of arrival, time differential of arrival or other. The WiFi transceivers 20 transfer their analysis to the WiFi location server 26 which determines the location of the reader 22. The location of the reader 22 is then transmitted to the reader 22 directly, or fed back to at least one of the WiFi transceivers 20, which transmits it to the reader 22. In one embodiment, the determined location is an exact location, for example, GPS coordinates or a specific point as measured by distance from another known point.

The reading of the identification number and the determination of a location may be repeated for each of the other equipment units 24-2, 24-3, 24-4, and 24-5. Regardless of which location method is used, the location of each equipment unit 24, once determined, is linked with the identification number of that equipment unit 24. The order of determining location of the units 24 and reading the identification number of the equipment units 24 is not vital and either may be done first, as long as a link between the location and the identification number of the particular equipment unit 24 is made. The installer can also add textual comments like: "Hidden above the ceiling" etc.

The reader 22 may be part of, or communicatively coupled with, a portable computer or smart phone coupled, via a wired or wireless connection, to the Internet. In another embodiment, the RFID reader 22 may have memory sufficient to store the location data and equipment identification numbers for later storage in a database. The equipment IDs and the location data related to the installed equipment units 24 may be sent to a post processing system and stored in a database, as will be discussed in more detail below. In one embodiment, the database is remotely located from the reader and equipment units. In one embodiment, the equipment identification and the location data may be transmitted via an optical fiber distribution system to the remotely located database unit. Later, when requested, the equipment units 24, along with their IDs and their location, may be presented on a floor plan.

Figure 3:
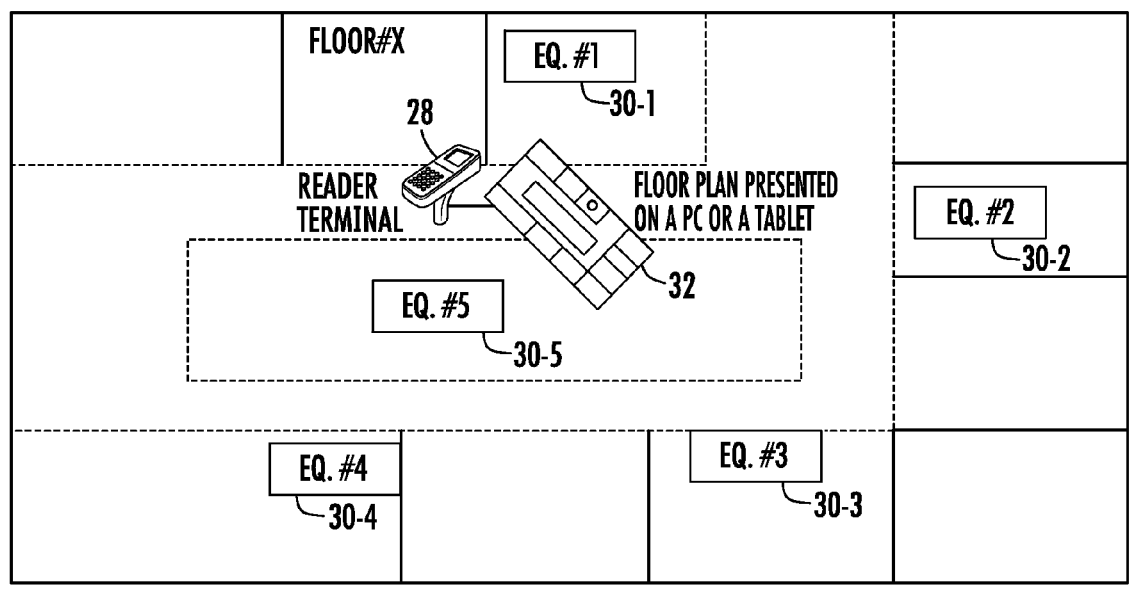
FIG. 3 is a schematic diagram of an exemplary system for providing location information for equipment in a building, in which the location data is determined using a digitized floor plan.

FIG. 3 is a schematic diagram of an exemplary system for providing location information for equipment in a building, in which the location data is determined using a digitized floor plan. A reader 28, as shown in FIG. 3, may be used to determine a location of various equipment units 30. In one embodiment, the reader 28 is a mobile reader. The reader 28 may be an RFID reader or an optical reader. The embodiment shown in FIG. 3 includes five (5) pieces of equipment (30-1, 30-2, 30-3, 30-4, and 30-5, collectively referred to as equipment units 30) on a floor of a building, although the system may include any number of equipment units 30. In this embodiment, the reader 28 has the ability to scan barcodes and/or read an RFID tag. The reader 28 may read an identification of equipment unit 30-1 using optical (barcode) or Rmeans while proximate the equipment unit 30-1. In one embodiment, the identification may be a unique identification, such as an identification number. For example, a barcode of the identification number may be attached to each of the equipment units 30. In another embodiment, an RFID tag may be attached to each of the equipment units 30, which contains an identification number and optionally other information about the equipment unit 30 to which the RFID tag is attached.

In the embodiment shown in FIG. 3, location data may be found by the use of a digitized floor plan 32 connected to the reader 28. The digitized floor plan 32 may be presented on a portable computing device, laptop, tablet, smart phone, or other portable device having software and a graphical user interface capable of running software to display a digital floor plan showing the locations of where equipment units are to be installed. In one embodiment, the digitized floor plan 32 shows the location where each of the equipment units 30 is to be installed. In one embodiment, the location is an exact location, for example, GPS coordinates or a specific point as measured by distance from another known point. In one embodiment, the location may include GPS coordinates. The location information on the digitized floor plan 32 may be in the form of an optical barcode in one embodiment. The location information may be stored in an RFID tag.

With continued reference to FIG. 3, at each location at which a respective one of the equipment units 30 is to be installed, while proximate the equipment unit 30-1, the installer uses the reader 28 to point to the respective location on the digitized floor plan 32. As a response, the digitized floor plan 32 provides the location data to the reader 28.

While still proximate the equipment unit 30-1, the reader 28 is then used to read the identification number of one or more of the equipment units 30 using optical (barcode) or radio (RFID) means. For example, in one embodiment, a barcode of the identification number may be attached to each of the equipment units 30. In another embodiment, an RFID tag may be attached to each of the equipment units 30, which contains an identification number and optionally other information about the equipment unit 30 to which the RFID tag is attached. The location of the equipment unit 30-1 may then be associated with or linked to the identification number of the equipment unit 30-1. Barcode marking may be done for each location on the digitized floor plan 32.

In one embodiment, the digitized floor plan 32 may be installed on a separate device associated with the reader 28, such as a laptop computer, a tablet, a smartphone, or any portable communication device (not shown).

The digitized floor plan 32 may comprise one or more optical codes for each room and/or location. The mobile reader 28 may be configured to read the one or more optical codes from the digitized floor plan 32 installed on the device in order to obtain the location of the equipment unit 30 to be installed. In another embodiment, the digitized floor plan 32 may be installed on the reader 28. The reader 28 may also include a software application installed on the reader 28, which may be used to read the digitized floor plan 32 to obtain the location.

The reading of the identification number and the determination of a location may be repeated for each of the other equipment units 30-2, 30-3, 30-4, and 30-5. The order of reading location of the equipment units 30 and reading the identification number of the equipment units 30 is not vital and either may be done first, as long as a link between the location and the identification number of the particular unit 30 is made.

The installer can also add textual comments like: "Hidden above the ceiling" etc. The equipment IDs and the location data related to the installed equipment may be sent to a post processing system and stored in the database. The database may be remotely located from the reader and equipment units. The equipment identification and the location data may be transmitted via an optical fiber distribution system to the remotely located database unit. Later, when requested, they may be presented on a floor plan.

Figure 4:
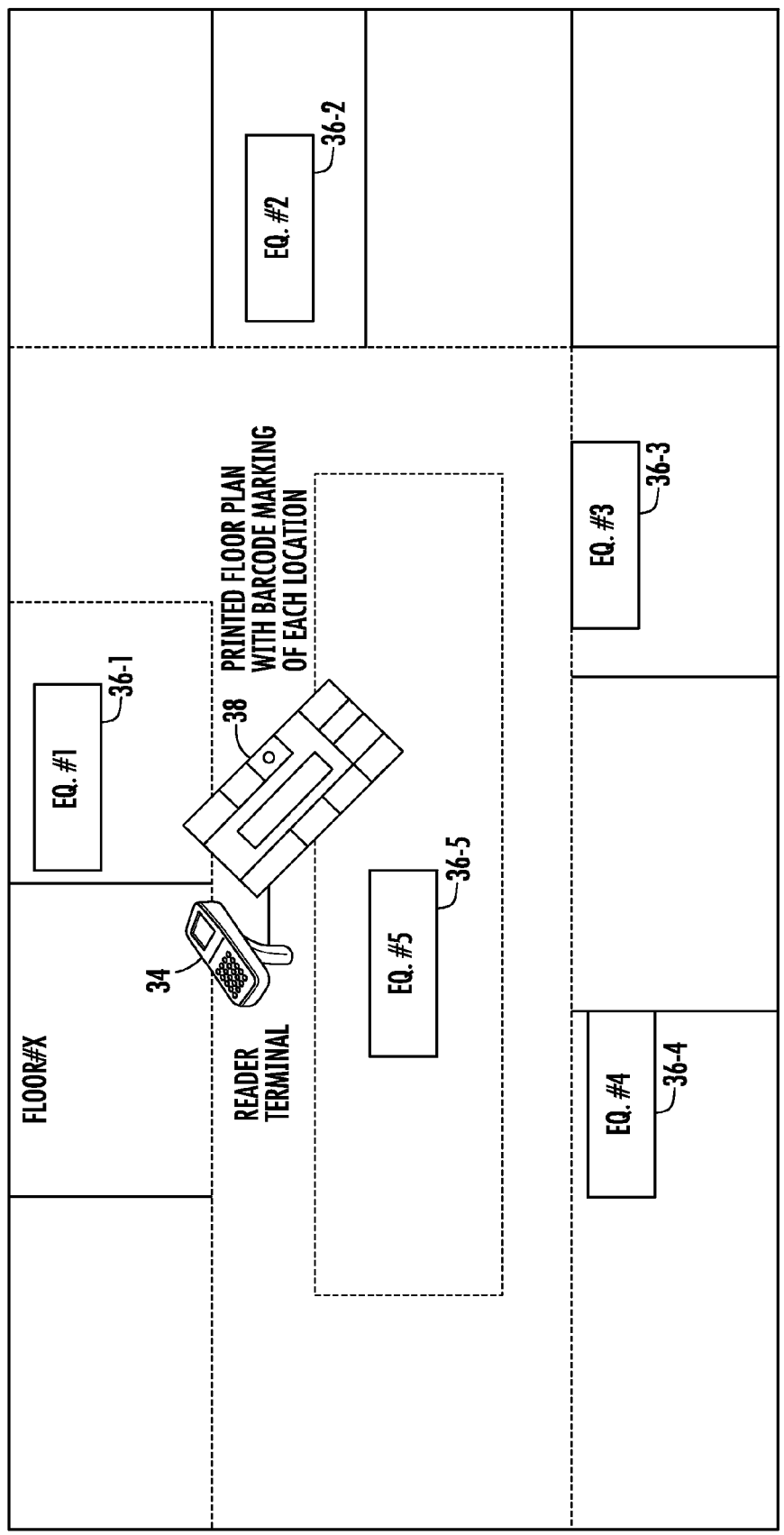
FIG. 4 is a schematic diagram of an exemplary system for providing location information for equipment in a building, in which the location data is determined by reading information from a hard copy of a floor plan.

FIG. 4 is a schematic diagram of an exemplary system for providing location information for equipment in a building, in which the location data is determined by reading information from a hard copy of a floor plan. A reader 34, as shown in FIG. 4, may be used to determine a location of various equipment units 36. In one embodiment, the reader 34 is a mobile reader. The reader 34 may be an RFID reader or an optical reader. The system shown in FIG. 4 includes five (5) pieces of equipment (36-1, 36-2, 36-3, 36-4, and 36-5, collectively referred to as equipment units 36) on a floor of a building, although the system may include any number of equipment units 36.

In this embodiment, the reader 34 has the ability to scan barcodes and/or read an RFID tag. The reader 34 may read an identification of equipment unit 36-1 using optical (barcode) or radio-frequency identification (RFID) means while proximate the equipment unit 36-1. In one embodiment, the identification may be a unique identification, such as an identification number. For example, in one embodiment, a barcode of the identification number may be attached to each of the equipment units 36. In another embodiment, an RFID tag may be attached to each of the equipment units 36, which contains an identification number and optionally other information about the equipment units 36.

Location data may be found by the use of a printed floor plan 38. The location data may be provided on the printed floor plan 38 in a form of optical signs (e.g. barcode). At each location the installer may use the reader 34 to read the location from the printed floor plan 38 while the reader 34 is proximate the equipment unit 36-1. Barcode marking may be done for each location on the printed floor plan 38.

In one embodiment, the determined location is an exact location, for example, GPS coordinates or a specific point as measured by distance from another known point. The installer may also use the reader 34 to read the identification number of the equipment unit 36-1 using optical (barcode) or radio (RFID) means while the reader 34 is still proximate the equipment unit 36-1. The reading of the identification number and the determination of a location may be repeated for each of the equipment units 36-1, 36-2, 36-3, 36-4, and 36-5. The order of reading the location of the equipment units 36 and reading the identification number of the equipment units 36 is not vital and either may be done first, as long as a link between the location and the identification number of the particular equipment unit 36 is made.

The installer can also add textual comments like: "Hidden above the ceiling" etc. The equipment IDs and the location data related to the installed equipment may be sent to a post processing system and stored in the database. In one embodiment, the database is remotely located from the reader and equipment units. In one embodiment, the equipment identification and the location data may be transmitted via an optical fiber distribution system to the remotely located database unit. Later, when requested, they may be presented on a floor plan.

FIG. 5 is an exemplary flow chart showing a method for providing location data by an indoor location system, such as the system of FIG. 1 or the system of FIG. 2. At block 40, a reader (such as reader 10 in FIG. 1 or reader 22 in FIG. 2) reads and records an identification of an equipment unit while the reader is proximate the equipment unit. In one embodiment, the identification may be a unique identification, such as an identification number. In one embodiment, this may be done using optical (barcode) means. In another embodiment, it may be done using radio-frequency identification (RFID) means. For example, in one embodiment, a barcode of the identification number may be attached to the equipment unit. In another embodiment, an RFID tag may be attached to the equipment units, which contains an identification number and optionally other information about the equipment unit. At block 42, the reader gets location data for the equipment unit from an indoor location system using any type of indoor location technology while the reader is still proximate the equipment unit 12-1. For example, it could be any of the systems and methods described above with respect to FIG. 1 and FIG. 2. In one embodiment, additional textual comments may be optionally added regarding the location of the equipment unit, like: "Hidden above the ceiling" etc. (block 44). The equipment identification numbers and the location data related to the installed equipment are then fed to a post processing system (block 46). The location data for the equipment unit is stored in a database in conjunction with the identification number and can be presented on a floor plan when requested (block 48).

FIG. 6 is an exemplary flow chart showing a method for providing location data by using a floor plan, such as the floor plan in FIG. 3 and/or FIG. 4. At block 50, a reader (such as reader 28 in FIG. 3 or reader 34 in FIG. 4) reads and records an identification of an equipment unit while the reader is proximate the equipment unit. In one embodiment, the identification may be a unique identification, such as an identification number. In one embodiment, this may be done using optical (barcode) means. In another embodiment, it may be done using radio-frequency identification (RFID) means. For example, in one embodiment, a barcode of the identification number may be attached to the equipment unit. In another embodiment, an RFID tag may be attached to the equipment units, which contains an identification number and optionally other information about the equipment unit. At block 52, a location on a floor plan where the equipment identification number was recorded is obtained while the reader is still proximate the equipment unit. In one embodiment, additional textual comments may be optionally added regarding the location of the equipment unit, like: "Hidden above the ceiling" etc. (block 54). The equipment identification numbers and the location data related to the installed equipment are then fed to a post processing system (block 56). The location data for the equipment unit is stored in a database in conjunction with the identification number and can be presented on a floor plan when requested (block 58).

Figure 7:
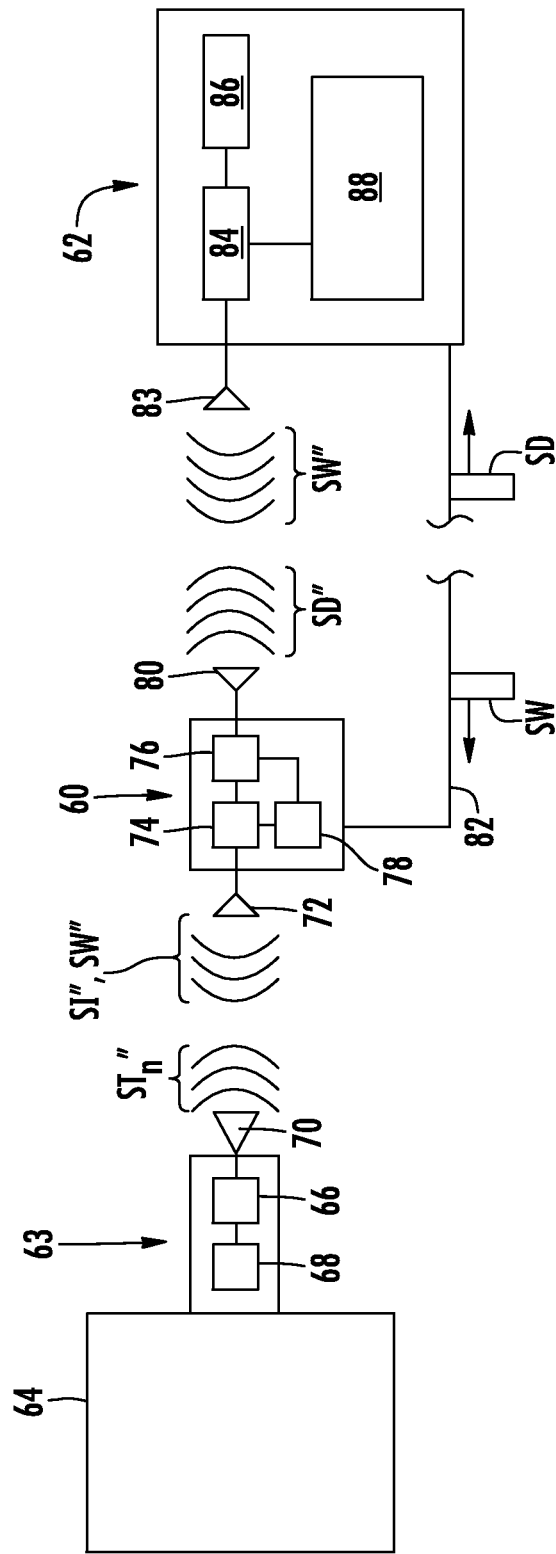
FIG. 7 is a detailed schematic diagram of an example embodiment of an RFID tag attached to an equipment unit, and also showing the details of an example RFID tag reader and an example database unit in operable communication therewith.

FIG. 7 is a detailed schematic diagram of an example embodiment of an RFID tag attached to an equipment unit, and also showing the details of an example RFID tag reader and an example database unit in operable communication therewith. In the embodiment of FIG. 7 a reader may read an RFID tag on an equipment unit and transmit the information from the RFID tag wirelessly to a database remotely located from the reader and the equipment unit. Once the identification number and the location data for an equipment unit are obtained by the reader, the identification number and location data may be stored in a database. In one embodiment, the database is remotely located from the reader and equipment units. In one embodiment, the equipment identification and the location data may be transmitted via an optical fiber distribution system to the remotely located database unit. The embodiment shown in FIG. 7 uses an RFID reader and an optical wireless system to communicate the identification and location data to the database along with other information relating to the equipment unit.

Referring again to FIG. 7, an RFID tag 63 is attached to an equipment unit 64. FIG. 7 also shows details of RFID tag reader 60 and database unit 62. The RFID tag 63 includes a microcircuit 66 (e.g., in the form of a microchip) electrically connected to a memory unit 68 and to a receive/transmit antenna 70. Memory unit 68 is adapted to store information ("RFID tag data"), which includes at least one property of the associated equipment unit, but more typically includes a number of such properties. Typical RFID tag data includes, for example, the type of equipment to which the RFID tag is affixed, the equipment manufacturer, the manufacturer part number, the date of equipment manufacture, the date of equipment installation, the equipment's operational status, equipment maintenance information and history, equipment location in the system (e.g., global positioning system (GPS) coordinates), a part or other identification number, and so on. Microcircuit 66 is adapted to receive an electromagnetic RFID-tag interrogation signal SI" emitted by RFID reader via receive/transmit antenna 72 and to process this signal. The processing includes comparing the received interrogation signal SI" to a corresponding bit sequence stored value in memory unit 68. In an example embodiment, microcircuit 66 is adapted to use the energy in the interrogation signal to power itself. If the content of the received interrogation signal SI" is confirmed, then microcircuit 66 is adapted to generate an RFID tag signal STn representative of the stored RFID tag data and to transmit this signal to RFID tag reader 60 as an electromagnetic tag signal STn' to be read by RFID tag reader 60.

In an example embodiment, one or more of the RFID tags are adapted to generate electromagnetic RFID tag signals at a frequency that is not significantly affected by soil or water, such as in the frequency range from 100 KHz to 125 KHz. This is so that the RFID tag signal can be read even though the corresponding equipment unit is buried underground or covered by water. Here, the electromagnetic RFID tag signals are based on magnetic inductive coupling. Suitable RFID tags and associated RFID tag readers are available from 3M Corporation.

Also in an example embodiment, at least some of the RFID tags are adapted to generate RFID tag signals at a frequency suitable for long-range RFID-tag reading, such at the 915 MHz band or the 2.45 GHz band. Such RFID tags are best suited for aerial or aboveground equipment units, or more generally for equipment units that are not buried or otherwise obstructed by an intervening RF-frequency-absorbing medium. Suitable RFID tags are available from Alien Technologies, Inc., as Model Nos. ALL-9440 and ALL-9350.

In an example embodiment, RFID tag reader 60 and one or more of RFID tags 63 are adapted with encryption capability so that the interrogation signal and the RFID tag signal can be encrypted to prevent third parties from reading or overwriting RFID tag data.

With continuing reference to FIG. 7, an example embodiment of RFID tag reader 60 includes a receive/transmit antenna 72, a signal processing circuit 74 electrically connected thereto, and a memory unit 76 electrically connected to the signal processing circuit 74. RFID tag reader 60 also includes other electronic components that not essential to the disclosed embodiments and so are not shown. In an example embodiment, RFID tag reader 60 includes a GPS circuit 78 adapted to provide GPS data to signal processing circuit 74 and/or to memory unit 76.

Signal processing circuit 74 is adapted to generate interrogation signal SI and transmit it via receive/transmit antenna 72 to RFID tag 63 as an electromagnetic interrogation signal SI". Signal processing circuit 74 is also adapted to write information to RFID tag 63 based on information either stored in memory unit 76, entered into the RFID tag reader directly by a user, or communicated to it from database unit 62, as described below.

RFID tag reader 60 is also adapted to receive electromagnetic RFID tag signal STn" via antenna 72, which converts this signal back to electrical RFID tag signal STn. Signal processing circuit 74 is further adapted to extract the RFID tag data from this signal and store this data in memory unit 76 and/or transmit this data to database unit 62.

In an example embodiment, RFID tag reader 60 is operably coupled to database unit 62 so that it can transmit information to and receive information from the database unit. In an example embodiment, database unit 62 includes a second receive/transmit antenna 83 used to wirelessly communicate with RFID tag reader 60, through a Wi-Fi network or through the cellular phone network, as examples. In another example embodiment, database unit 62 is operably coupled to RFID tag reader 60 via a non-wireless (e.g., an electrical or optical) communication link 82, such as an Ethernet link.

Database unit 62 includes a microprocessor 84 operably connected thereto, a memory unit 86 operably coupled to the microprocessor, and a display 88 operably coupled to the microprocessor. In an example embodiment, database unit 62 is or otherwise includes a computer, such as a laptop computer, personal computer, smart phone, or workstation. In an example embodiment, database unit 62 is mobile (e.g., as a laptop computer or hand-held device) and is brought out to the field so as to be accessible to those working in the field to deploy or maintain the system. Also in an example embodiment, database unit 62 supports a graphical user interface (GUI) so that a database-unit user can view graphical images and interact with interactive graphical images on display 88.

In an example embodiment, RFID tag reader 60 transmits RFID tag data to database unit 62 either non-wirelessly via a non-wireless data signal SD sent over communication link 82, or wirelessly via electromagnetic data signal SD". Database unit 62 then stores and processes the RFID tag data, such as described below.

Also in an example embodiment, database unit 62 either wirelessly and/or non-wirelessly transmits write information in respective information signals SW and/or (electromagnetic) signal SW" to RFID tag reader 60. The write information in signals SW or SW" is then written by RFID tag reader 60 to one or more RFID tags 63 and stored therein as RFID tag data.

Microprocessor 84 in database unit 62 is adapted to process the RFID tag data to create useful information about the status of the system and equipment units 64. In an example embodiment, this information is displayed on display 88. In an example embodiment, the information is represented as graphics, and further is presented by database unit 62 in the form of one or more interactive maps. In one embodiment, the interactive maps may be in the form of a floor plan. The maps may include, for example, equipment inventory data, equipment location data, equipment connectivity data, and/or equipment status data. Example interactive maps for facilitating the deployment and maintenance of the system are discussed in greater detail below.

Figure 8:
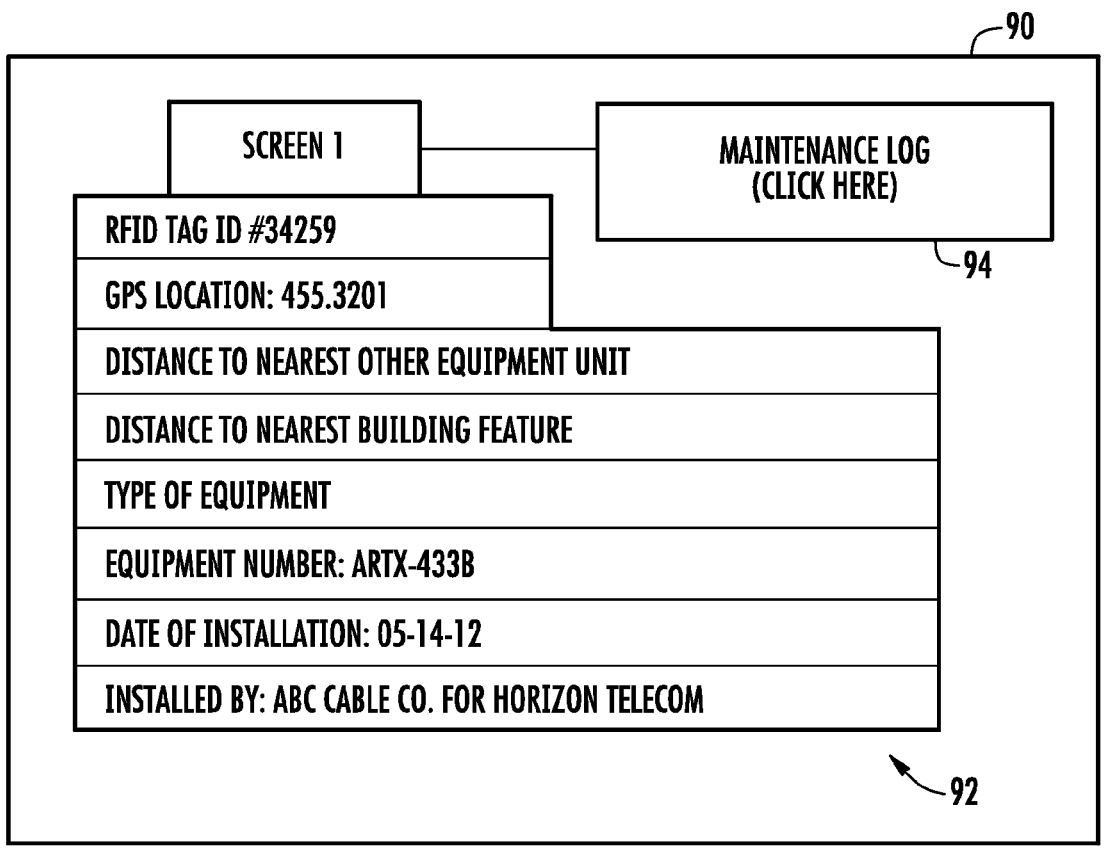
FIG. 8 is an exemplary information table as displayed on the database unit display when the cursor "clicks on" an icon.

FIG. 8 is an exemplary information table as displayed on the database unit display when the cursor "clicks on" an icon on an interactive map. Table 92 includes the data of the equipment unit that is clicked-on. The example data includes the equipment ID serial number, the GPS location, the distance to the nearest other piece of equipment, the distance to the nearest known building feature, the type of equipment, the equipment part number, the date of installation, and who installed the equipment. Table 92 also includes one or more active icons, such as a maintenance log icon 94 that, when clicked on, displays additional data regarding the maintenance performed.

Figure 9:
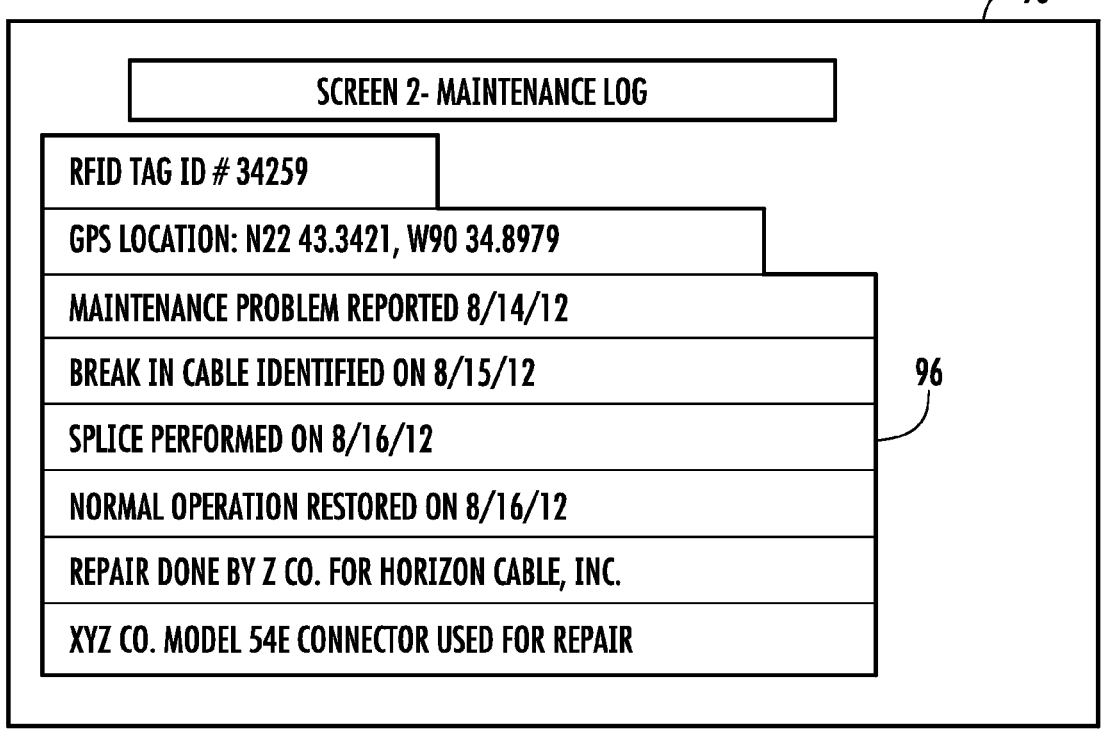
FIG. 9 is an example maintenance log table as displayed on the database unit display when the cursor "clicks on" the maintenance log icon of the information table of FIG. 8.

FIG. 9 is an example maintenance log table as displayed on the database unit display when the cursor "clicks on" the maintenance log icon of the information table of FIG. 8. Exemplary maintenance log 96 is displayed on display 90 when maintenance log icon 94 of FIG. 8 is clicked. Maintenance log 96 shows example maintenance data, such as the equipment serial number, the GPS location of the equipment unit, the date a maintenance problem was reported, the nature of the problem identified, what repair was performed and when, when the system was placed back in operation, who effected the repair, and what parts were used to make the repair.

The systems for documenting the location of installed equipment disclosed above can be used in any system having multiple devices or pieces of equipment, including but not limited to various communication systems. A distributed antenna system is one non-limiting example of the type of system in which the systems for documenting the location of installed equipment disclosed herein may be used. In one embodiment, the distributed antenna system in which the systems for documenting the location of installed equipment disclosed herein can be used is an optical fiber-based distributed antenna system. In another embodiment, the distributed antenna system in which the systems for documenting the location of installed equipment disclosed herein can be used is a copper-based distributed antenna system, which may use copper coaxial fibers and/or twisted pair fibers. Alternatively, the systems for documenting the location of installed equipment disclosed herein can be used in a distributed antenna system which is a mixed distributed antenna system comprised of both copper-based (coaxial and/or twisted pair fibers) and optical fiber-based distributed antenna systems.

Figure 10:
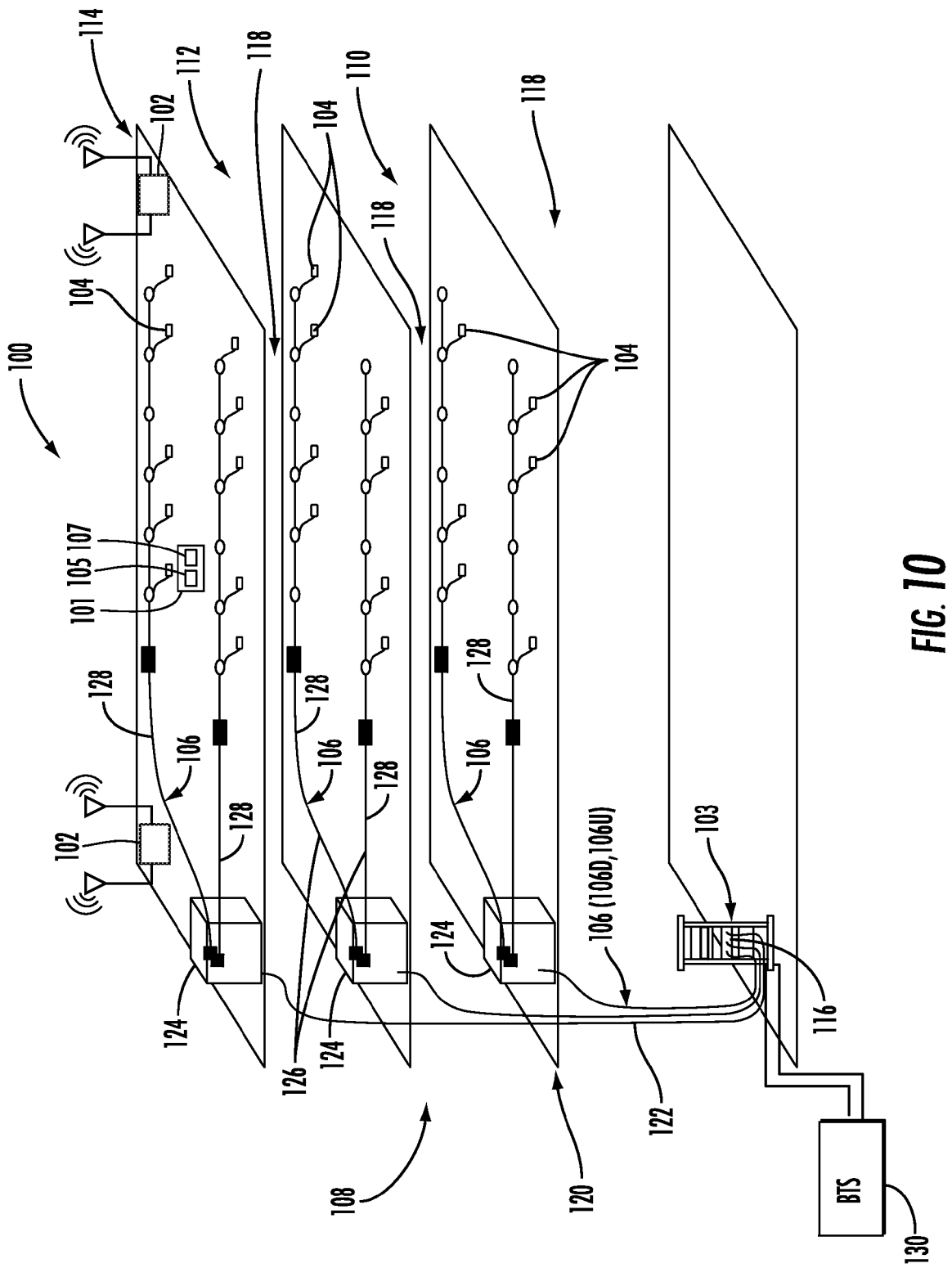
FIG. 10 is a partially schematic cut-away diagram of an exemplary building infrastructure in which an exemplary system for providing location information for equipment can be used for equipment in an exemplary distributed antenna system can be employed.
Figure 11:
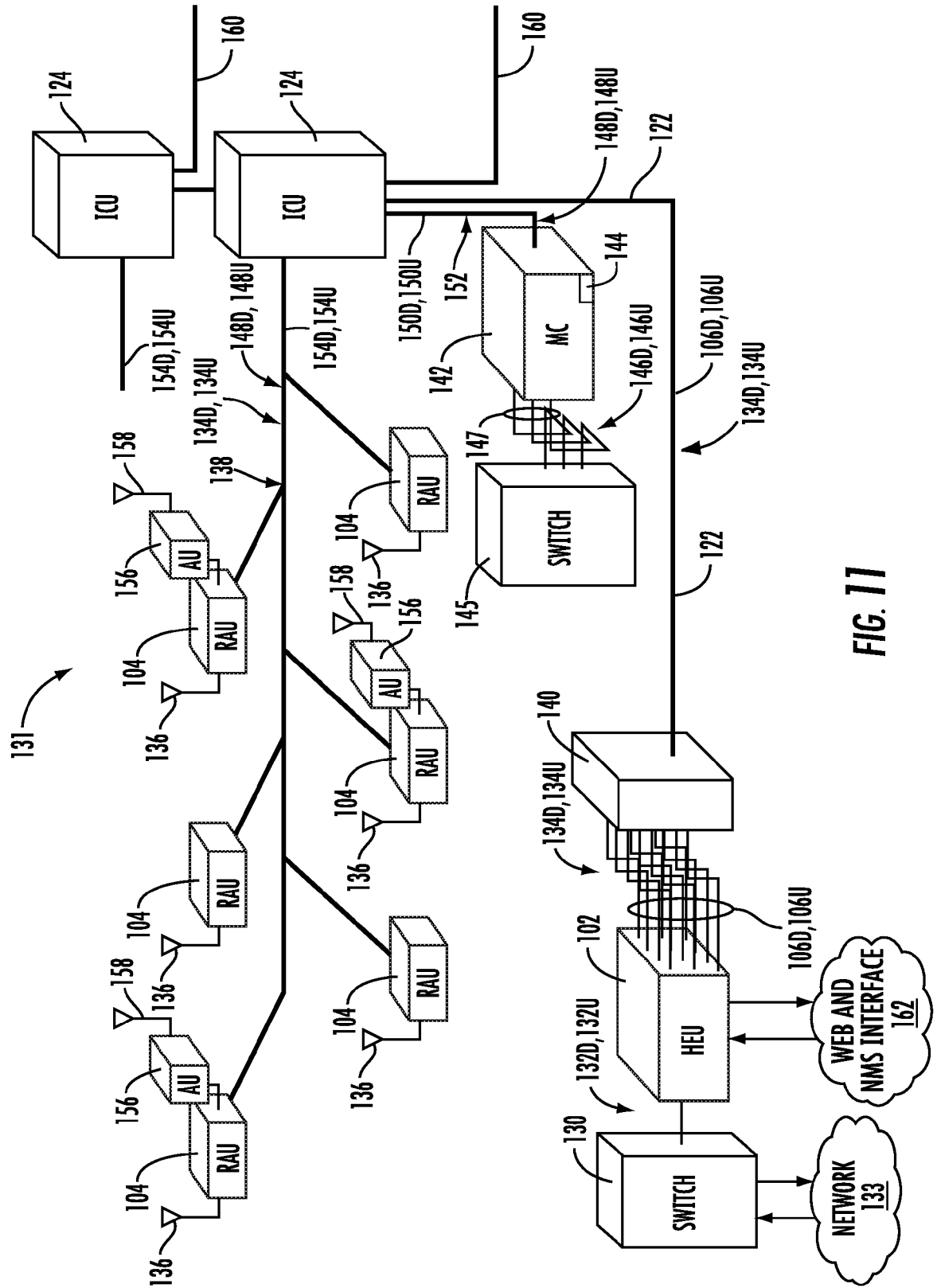
FIG. 11 is a schematic diagram of an exemplary embodiment of a distributed antenna system in which an exemplary system for providing location information for equipment can be used.

FIG. 10 and FIG. 11 provide examples of distributed antenna systems in which the embodiments described herein for documenting the location of installed equipment may be used. However, it is noted that the systems, methods, and devices for documenting the location of installed equipment may be used in any system where equipment is installed over an area, including but not limited to any communications system where various pieces of equipment are installed at various locations in a building.

A distributed antenna system, as described more fully below with respect to FIG. 10 and FIG. 11, may be designed to distribute analog radio signals within buildings. This is done by converting the electrical radio signal into an optical RF signal at a head-end unit (HEU) or at an optical interface unit (OIU), distributing the signal on an optical cabling infrastructure to a number of remote antenna units (RAUs), converting the optical RF signals back into an electrical radio signal at the RAU, and transmitting the electrical radio signals to wireless units via an antenna. The structured cabling solution may include one or more copper pair(s) to provide power to active devices in the system as necessary.

The distributed antenna system may also have a remote expansion unit (RXU) that connects to the RAU. The RXU may provide an additional RF communications band or bands, or the RXU may provide multiple-input, multiple-output (MIMO) support within a band contained in the RAU.

An optical fiber-based distributed antenna system 100 can be deployed indoors, as shown in FIG. 10. A reader 101 of any of the types described above with respect to FIGS. 1-4, may be used together with one or more location transceivers 102 (which may be like the indoor location transmitters 14 in FIG. 1, or like the WiFi transceivers 20 in FIG. 2) as described above, to document the location of the various pieces of equipment in the distributed antenna system 100. In one embodiment, the reader 101 may have a transceiver 105, which is capable of transmitting and receiving signals, including but not limited to GPS, WiFi, and other signals, to and from the indoor location transceivers 102, as discussed above with respect to FIG. 1 and FIG. 2. In one embodiment, the reader 101 may also have a memory 107 configured to store data, including but not limited to the associated unique identification and determined location of the equipment units, as discussed above with respect to FIG. 1 and FIG. 2.

FIG. 10 is a partially schematic cut-away diagram of a building infrastructure 108 employing an optical fiber-based distributed antenna system. The building infrastructure 108 generally represents any type of building in which an optical fiber-based distributed antenna system can be deployed. The optical fiber-based distributed antenna system 100 incorporates an HEU 103 to provide various types of communications services to coverage areas within the building infrastructure 108, as an example. For example, as discussed in more detail below, the optical fiber-based distributed antenna system 100 in this embodiment is configured to receive wireless RF communications signals and convert the RF communications signals into RoF signals to be communicated over the optical fiber 106 to multiple RAUs 104. The optical fiber-based distributed antenna system 100 in this embodiment can be, for example, an indoor distributed antenna system (IDAS) to provide wireless service inside the building infrastructure 108. These wireless signals can include cellular service, wireless services such as RFID tracking, Wireless Fidelity (WiFi), local area network (LAN), WLAN, and combinations thereof, as examples. In other embodiments, other wireless signals may also be used, including, but not limited to, Bluetooth, ZigBee, near field communication (NFC), or other wireless signals.

With continuing reference to FIG. 10, the building infrastructure 108 in this embodiment includes a first (ground) floor 110, a second floor 112, and a third floor 114. The floors 110, 112, 114 are serviced by the HEU 103 through a main distribution frame 116 to provide antenna coverage areas 118 in the building infrastructure 108. Only the ceilings of the floors 110, 112, 114 are shown in FIG. 10 for simplicity of illustration. In the example embodiment, a main cable 120 has a number of different sections that facilitate the placement of a large number of RAUs 104 in the building infrastructure 108. Each RAU 104 in turn services its own coverage area in the antenna coverage areas 118. The main cable 120 can include, for example, a riser cable 122 that carries all of the downlink and uplink optical fibers 106D, 106U to and from the HEU 103. The riser cable 122 may be routed through an interconnect unit (ICU) 124. The ICU 124 may also be configured to provide power to the RAUs 104 via an electrical power line (not shown) provided inside an array cable 128, or tail cable or home-run tether cable as other examples, and distributed with the downlink and uplink optical fibers 106D, 106U to the RAUs 104. The main cable 120 can include one or more multi-cable (MC) connectors adapted to connect select downlink and uplink optical fibers 106D, 106U, along with an electrical power line, to a number of optical fiber cables 126.

The main cable 120 enables the multiple optical fiber cables 126 to be distributed throughout the building infrastructure 108 (e.g., fixed to the ceilings or other support surfaces of each floor 110, 112, 114) to provide the antenna coverage areas 118 for the first, second, and third floors 110, 112, and 114. In an example embodiment, the HEU 103 is located within the building infrastructure 108 (e.g., in a closet or control room), while in another example embodiment, the HEU 103 may be located outside of the building infrastructure 108 at a remote location. A base transceiver station (BTS) 130, which may be provided by a second party such as a cellular service provider, is connected to the HEU 103, and can be co-located or located remotely from the HEU 103. A BTS is any station or source that provides an input signal to the HEU 103 and can receive a return signal from the HEU 103. In a typical cellular system, for example, a plurality of BTSs are deployed at a plurality of remote locations to provide wireless telephone coverage. Each BTS serves a corresponding cell, and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater or picocell as other examples.

The optical fiber-based distributed antenna system 100 in FIG. 10 and described above provides point-to-point communications between the HEU 103 and the RAU 104. Each RAU 104 communicates with the HEU 103 over a distinct downlink and uplink optical fiber pair to provide the point-to-point communications. Whenever an RAU 104 is installed in the optical fiber-based distributed antenna system 100, the RAU 104 is connected to a distinct downlink and uplink optical fiber pair connected to the HEU 103. The downlink and uplink optical fibers 106U, 106D may be provided in a fiber optic cable. Multiple downlink and uplink optical fiber pairs can be provided in a fiber optic cable to service multiple RAUs 104 from a common fiber optic cable. For example, with reference to FIG. 10, RAUs 104 installed on a given floor 110, 112, or 114 may be serviced from the same optical fiber 106. In this regard, the optical fiber 106 may have multiple nodes where distinct downlink and uplink optical fiber pairs can be connected to a given RAU 104. One downlink optical fiber 106 could be provided to support multiple channels each using wavelength-division multiplexing (WDM).

FIG. 11 is a schematic diagram of an exemplary embodiment of providing digital data services over separate downlink and uplink optical fibers from RF communications services to RAUs in an optical fiber-based distributed antenna system 131. The optical fiber-based distributed antenna system 131 is described as including some components provided in the optical fiber-based distributed antenna system 100 of FIG. 10. These common components are illustrated in FIG. 11 with common element numbers with FIG. 10. However, note that the optical fiber-based distributed antenna system 131 could also employ other components.

As illustrated in FIG. 11, the HEU 102 is provided. The HEU 102 receives the downlink electrical RF communications signals 132D from the BTS 130. As previously discussed, the HEU 102 converts the downlink electrical RF communications signals 132D to downlink optical RF communications signals 134D to be distributed to the RAUs 104. The HEU 102 is also configured to convert the uplink optical RF communications signals 134U received from the RAUs 104 into uplink electrical RF communications signals 132U to be provided to the BTS 130 and onto a network 133 connected to the BTS 130. A patch panel 140 may be provided to receive the downlink and uplink optical fibers 106D, 106U configured to carry the downlink and uplink optical RF communications signals 134D, 134U. The downlink and uplink optical fibers 106D, 106U may be bundled together in one or more riser cables 122 and provided to one or more ICUs 124, as previously discussed and illustrated in FIG. 10.

To provide digital data services in the optical fiber-based distributed antenna system 131 in this embodiment, a digital data services controller (also referred to as "DDS controller") 142 in the form of a media converter in this example is provided. The DDS controller 142 can include only a media converter for provision media conversion functionality or can include additional functionality to facilitate digital data services. The DDS controller 142 is configured to provide digital data services over a communications link, interface, or other communications channel or line, which may be either wired, wireless, or a combination of both. The DDS controller 142 may include a housing configured to house digital media converters (DMCs) 144 to interface to a DDS switch 145 to support and provide digital data services. For example, the DDS switch 145 could be an Ethernet switch. The DDS switch 145 may be configured to provide Gigabit (Gb) Ethernet digital data service as an example. The DMCs 144 are configured to convert electrical digital signals to optical digital signals, and vice versa. The DMCs 144 may be configured for plug and play installation (i.e., installation and operability without user configuration required) into the DDS controller 142. For example, the DMCs 144 may include Ethernet input connectors or adapters (e.g., RJ-45) and optical fiber output connectors or adapters (e.g., LC, SC, ST, MTP).

With continuing reference to FIG. 11, the DDS controller 142 (via the DMCs 144) in this embodiment is configured to convert downlink electrical digital signals (or downlink electrical digital data services signals) 146D over digital line cables 147 from the DDS switch 145 into downlink optical digital signals (or downlink optical digital data services signals) 148D that can be communicated over downlink optical fiber 154D to RAUs 104. The DDS controller 142 (via the DMCs 144) is also configured to receive uplink optical digital signals 148U from the RAUs 104 via the uplink optical fiber 154U and convert the uplink optical digital signals 148U into uplink electrical digital signals 146U to be communicated to the DDS switch 145. In this manner, the digital data services can be provided over optical fiber as part of the optical fiber-based distributed antenna system 131 to provide digital data services in addition to RF communication services. Client devices located at the RAUs 104 can access these digital data services and/or RF communications services depending on their configuration. Exemplary digital data services include Ethernet, WLAN, WiMax, WiFi, Digital Subscriber Line (DSL), and LTE, etc. Ethernet standards could be supported, including but not limited to 100 Megabits per second (Mbs) (i.e., fast Ethernet) or Gigabit (Gb) Ethernet, or ten Gigabit (10G) Ethernet.

With continuing reference to FIG. 11, in this embodiment, downlink and uplink optical fibers 150D, 150U are provided in a fiber optic cable 152 that is interfaced to the ICU 124. The ICU 124 provides a common point in which the downlink and uplink optical fibers 150D, 150U carrying digital optical signals can be bundled with the downlink and uplink optical fibers 106U, 106D carrying optical RF communications signals. One or more of the fiber optic cables 152, also referenced herein as array cables 134, can be provided containing the downlink and uplink optical fibers 154D, 154U for RF communications services and digital data services to be routed and provided to the RAUs 104. Any combination of services or types of optical fibers can be provided in the array cable 152. For example, the array cable 152 may include single mode and/or multi-mode optical fibers for RF communication services and/or digital data services.

Examples of ICUs that may be provided in the optical fiber-based distributed antenna system 131 to distribute both downlink and uplink optical fibers 154D, 154U for RF communications services and digital data services are described in U.S. patent application Ser. No. 12/466,514, filed on May 15, 2009, and International Application No. PCT/US11/34725, filed May 2, 2011, both of which are incorporated herein by reference in their entireties.

With continuing reference to FIG. 11, some RAUs 104 can be connected to access units (AUs) 156, which may be access points (APs) or other devices supporting digital data services. AUs 156 can also be connected directly to the HEU 102. AUs 156 are illustrated, but the AUs 156 could be any other device supporting digital data services. In the example of AUs, the AUs 156 provide access to the digital data services provided by the DDS switch 145. This is because the downlink and uplink optical fibers 154D, 154U carrying downlink and uplink optical digital signals 148D, 148U converted from downlink and uplink electrical digital signals 146D, 146U from the DDS switch 127 are provided to the AUs 138 via the array cables 134 and RAUs 104. Digital data client devices can access the AUs 138 to access digital data services provided through the DDS switch 145. The AUs 156 may also each include an antenna 158 to provide wireless access to digital data services provided through the DDS switch 145. The ICUs 124 may be configured to provide power for both RAUs 104 and the AUs 136 over an electrical power line 160, as illustrated in FIG. 11.

In addition, an interface 162, which may include web and network management system (NMS) interfaces, may also be provided to allow configuration and communications to the various devices and components of the optical fiber-based distributed antenna system 131. A microcontroller, microprocessor, or other control circuitry may be included in the interface 162 to provide control operations for the interface 162. Although shown in FIG. 11 as being communicatively coupled to the HEU 102, the interface 162 may be communicatively coupled to any of the devices and components of the optical fiber-based distributed antenna system 131, including, but not limited to, any of the RAUs 104. A microcontroller, microprocessor, or other control circuitry may be included in the HEU 102 to provide control operations for the HEU 102.

In one embodiment, the interface 162 is capable of describing the connectivity of all system components and/or equipment units in the optical fiber-based distributed antenna system 131, such as the RAUs 104, in a logical way. In one embodiment, the interface 162 describes the connectivity of various system components according to an identification number, such as a serial number, as a simple tree structure. In another embodiment, once the equipment unit's physical location is determined, such as by using the methods and systems described herein, the interface 162, which may include web and network management system (NMS) interfaces, may be configured to show the connectivity of the various equipment units via serial number and location on a digitized floor plan, such as digitized floor plan 32. In one embodiment, the serial number and location of the various equipment units may be superimposed over the digitized floor plan 32. In another embodiment, the serial number and location of the various equipment units may be stored in a database and may be included in a printed floor plan, such as printed floor plan 38. By using the identification data and location data collected using the described methods and systems in a management system, "as built" documentation may be automatically created that shows the identification and location of installed equipment units on a floor plan, which may later ease the maintenance and troubleshooting activities.

Although not shown in FIG. 11, as discussed above with respect to FIG. 10, a reader 101 of any of the types described above with respect to FIGS. 1-4, may be used together with one or more location transceivers 102 (which may be like the indoor location transmitters 14 in FIG. 1, or like the WiFi transceivers 20 in FIG. 2) as described above, to document the location of the various pieces of equipment in the distributed antenna system 131 in FIG. 11. In one embodiment, the reader 101 may have a transceiver 105, which is capable of transmitting and receiving signals, including but not limited to GPS, WiFi, and other signals, to and from the indoor location transceivers 102, as discussed above with respect to FIG. 1 and FIG. 2. In one embodiment, the reader 101 may also have a memory 107 configured to store data, including but not limited to the associated unique identification and determined location of the equipment units, as discussed above with respect to FIG. 1 and FIG. 2.

Installing systems, such as above described distributed antenna systems, or other systems having multiple pieces of equipment, may be a time-intensive and labor-intensive process. The embodiments described herein provide a capability that can be used with every type of equipment that can be installed in or on a building or other structure. The embodiments disclosed herein may ease the equipment installation process and provide an easy and efficient way to create "as built" documentation, which may later ease the maintenance and troubleshooting activities.

By using the systems, methods, and devices disclosed herein, a location of equipment units "as built" may be automatically documented, which may save time and avoid mistakes as compared to a manual process of documenting the location of the equipment units in a system. By using a mobile reader to read the unique identification and determine the location of the equipment unit while the mobile reader is proximate the equipment unit, the location is known to be accurate and can be associated with the unique identification.

Although the embodiments disclosed herein are shown and discussed using various forms of wireless technology (see, e.g. the WiFi technology shown in FIG. 2), any alternative, or future wireless solution technology may be used, including similar or alternative forms of wireless transceivers or location servers. In addition, though the embodiments disclosed herein are shown and discussed using various forms of wireless communication tags, such as RFID or WiFi tags, any similar, alternative, or future form of wireless identification technology, solutions, or tags may be used. For example, other possible wireless technologies that may be used include, but are not limited to, Bluetooth, ZigBee, near field communication (NFC), and other wireless technologies.

Likewise, although certain of the embodiments disclosed herein are discussed using various forms optical barcodes, any similar, alternative, or future identification technology or solutions may be used. As non-limiting examples, Universal Product Code (UPC) barcodes or Quick Response Code (QR) codes may be used.

The embodiments disclosed herein include various steps. The steps of the embodiments disclosed herein may be performed by hardware components or may be embodied in machine-executable instructions, which may be used to cause a general-purpose or special-purpose processor programmed with instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage media, optical storage media, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The steps described in any of the embodiments herein may be performed in numerous different sequences other than the illustrated sequences. Furthermore, operations described in a single step may actually be performed in a number of different steps, or one or more steps may be combined. The steps illustrated in the flow chart diagrams may be subject to numerous modifications. Data, instructions, commands, information, signals, bits, symbols, and chips that may be referenced throughout the above description may be represented by voltages, currents, electromagnetic waves, magnetic fields or particles, optical fields or particles, or any combination thereof.

It is intended that the embodiments cover modifications and variations of the embodiments provided they come within the scope of the appended claims and their equivalents. Although specific terms are employed herein, they are used in a generic and descriptive sense only and not for purposes of limitation.

What is claimed is:

1. A system for documenting a location of installed equipment, comprising:
   a mobile reader; and
   a memory,
   wherein the mobile reader is configured to:
      read a unique identification of an installed equipment unit while the mobile reader is proximate the installed equipment unit;
      determine a location of the mobile reader while the mobile reader is proximate the installed equipment unit;
      determine a location of the installed equipment unit using the mobile reader, based on the location of the mobile reader while the mobile reader is proximate the installed equipment unit; and
      associate the location of the installed equipment unit with the unique identification of the installed equipment unit; and
   wherein the memory is configured to store the associated location and the unique identification of the installed equipment unit.

2. The system of claim 1, wherein the mobile reader is an optical reader and is further configured to read the unique identification from an optical code associated with the installed equipment unit.

3. The system of claim 2, wherein the optical code is a barcode.

4. The system of claim 2, wherein the optical code is a Quick Response (QR) code.

5. The system of claim 1, wherein the mobile reader is an RFID reader and is further configured to read the unique identification from an RFID tag associated with the installed equipment unit.

6. The system of claim 1, wherein the memory is located in the mobile reader.

7. The system of claim 1, wherein the memory is located in a database remotely located from the mobile reader and the installed equipment unit.

8. The system of claim 7, wherein the mobile reader is communicatively coupled to the database and the mobile reader is further configured to transmit the unique identification and the location to the database.

9. The system of claim 1, further comprising one or more indoor location transmitters, wherein the mobile reader is further configured to:
receive GPS signals at the mobile reader from the one or more indoor location transmitters; and
determine the location of the installed equipment unit using an indoor location method based on the GPS signals received at the mobile reader from the one or more indoor location transmitters.

10. The system of claim 1, further comprising one or more indoor location transmitters having manually set GPS coordinates, and wherein the mobile reader is further configured to:
receive the manually set GPS coordinates at the mobile reader from the one or more indoor location transmitters; and
determine the location of the installed equipment unit using the manually set GPS coordinates received at the mobile reader from the one or more indoor location transmitters.

11. The system of claim 1, further comprising one or more indoor wireless transceivers; wherein the mobile reader is further configured to:
receive signals from the one or more indoor wireless transceivers;
analyze the signals using a location determination technique; and
determine the location of the installed equipment unit based on the analyzed signals.

12. The system of claim 11, wherein the indoor wireless transceivers are WiFi transceivers and the signals are WiFi signals.

13. The system of claim 11, wherein the indoor wireless transceivers and the signals are related to a wireless technology selected from a group comprising Bluetooth, Zigbee, and near field (NFC) wireless technologies.

14. The system of claim 1, further comprising:
one or more indoor wireless transceivers; and
a location server,
wherein the mobile reader is further configured to transmit signals indicative of a location of the mobile reader to the one or more indoor transceivers;
wherein the one or more indoor wireless transceivers are configured to:
analyze the received signals using a location determination technique to get a location analysis; and
transmit the location analysis from the one or more indoor wireless transceivers to a location server; and
wherein the location server is configured to:
receive the location analysis from the one or more indoor wireless transceivers; and
determine the location of the installed equipment unit based on the received location analysis; and transmit the location of the installed equipment unit to the mobile reader.

15. The system of claim 14, wherein the indoor wireless transceivers are WiFi transceivers and the signals are WiFi signals.

16. The system of claim 14, wherein the indoor wireless transceivers and the signals are related to a wireless technology selected from a group comprising Bluetooth, Zigbee, and near field (NFC) wireless technologies.

17. The system of claim 1, wherein the mobile reader is further configured to obtain the location from a digitized floor plan.

18. The system of claim 17, wherein the digitized floor plan is installed on a device and comprises one or more optical codes for each room and/or location, and wherein the mobile reader is further configured to read the one or more optical codes from the digitized floor plan installed on the device.

19. The system of claim 17, wherein the digitized floor plan is installed on the mobile reader, and wherein the mobile reader is further configured to use a software application installed on the mobile reader to read the digitized floor plan to obtain the location.

20. The system of claim 1, wherein the mobile reader is further configured to read the location from a code on a printed floor plan, and wherein the code is at least one of a barcode and a Quick Response (QR) code.

* * * * *